US009720114B2

(12) United States Patent
Blagojevic et al.

(10) Patent No.: US 9,720,114 B2
(45) Date of Patent: Aug. 1, 2017

(54) IMAGING TEST PIECE FOR MEDIUM AND LARGE SECURITY X-RAY SCANNERS

(75) Inventors: Ned Blagojevic, Engadine (AU); Dudley Creagh, Griffith (AU)

(73) Assignee: Australian Nuclear Science and Technology Organization (AU)

( * ) Notice: Subject to any disclaimer, the term of this patent is extended or adjusted under 35 U.S.C. 154(b) by 833 days.

(21) Appl. No.: 13/000,903

(22) PCT Filed: Jun. 25, 2009

(86) PCT No.: PCT/AU2009/000820
§ 371 (c)(1),
(2), (4) Date: Mar. 28, 2011

(87) PCT Pub. No.: WO2009/155658
PCT Pub. Date: Dec. 30, 2009

(65) Prior Publication Data
US 2011/0266427 A1    Nov. 3, 2011

(30) Foreign Application Priority Data

Jun. 25, 2008   (AU) ................................ 2008903226

(51) Int. Cl.
*G01T 7/00*     (2006.01)
*G01V 5/00*     (2006.01)
*G01T 1/169*    (2006.01)

(52) U.S. Cl.
CPC .............. *G01T 7/005* (2013.01); *G01T 1/169* (2013.01); *G01V 5/0008* (2013.01)

(58) Field of Classification Search
CPC ........ G01T 7/005; G01T 1/169; G01V 5/0008
USPC ....................................... 250/252.1; 378/207
See application file for complete search history.

(56) References Cited

U.S. PATENT DOCUMENTS

| | | | | |
|---|---|---|---|---|
| 3,255,352 A * | 6/1966 | Johnston | ........................ | 250/303 |
| 5,319,547 A * | 6/1994 | Krug et al. | ..................... | 705/13 |
| 5,638,420 A * | 6/1997 | Armistead | ........................ | 378/57 |
| 5,841,835 A * | 11/1998 | Aufrichtig et al. | ........... | 378/207 |
| 6,170,689 B1 | 1/2001 | Flesher | | |
| 6,813,374 B1 * | 11/2004 | Karimi et al. | ................. | 382/131 |
| 7,215,736 B1 | 5/2007 | Wang | | |
| 2003/0039332 A1 * | 2/2003 | Bavendiek et al. | ............ | 378/58 |
| 2004/0245447 A1 * | 12/2004 | Karasawa | .................. | 250/252.1 |
| 2005/0117700 A1 | 6/2005 | Peschmann | | |
| 2005/0275553 A1 * | 12/2005 | Weekes | ......................... | 340/652 |
| 2007/0059151 A1 * | 3/2007 | Hager | ........................... | 414/783 |

FOREIGN PATENT DOCUMENTS

WO     2006073442     7/2006

OTHER PUBLICATIONS

ASTM, ASTM F792-01E2 Standard Practice for Evaluating the Imaging Performance of Security X-Ray Systems, Nov. 2001.*

(Continued)

*Primary Examiner* — David Porta
*Assistant Examiner* — Gisselle Gutierrez
(74) *Attorney, Agent, or Firm* — McDonnell Boehnen Hulbert & Berghoff LLP

(57) ABSTRACT

The invention provides a test device for assessing the detection capability of an X-ray system with a medium and/or large tunnel size. The device comprises a support and at least one test module mounted on the support. The device may optionally also comprise a stand which holds the support at a predetermined angle to the horizontal. The test module, or at least one of the test modules, is capable of being used in a test for an aspect of the detection capability.

38 Claims, 42 Drawing Sheets

(56) References Cited

OTHER PUBLICATIONS

ANSI N42.44-2008 American National Standard for the Performance of Checkpoint Cabinet X-Ray Imaging Security Systems, Nov. 4, 2008, IEEE.*
N42.46, 2008; "American National Standard for Determination of the Imaging Performance of X-Ray and Gamma-Ray Systems for Cargo and Vehicle Security Screening." IEEE, New York, NY, DOI: 10.1109/ANSI.2008.4606807, Aug. 19, 2008.
ASTM Standard F792-01, 2001, "Standard Practice for Evaluating the Imaging Performance of Security X-Ray Systems," ASTM International, West Conshohocken, PA, DOI: 10.1520/F0792-01, Nov. 2001.
"Standard Practice for Evaluating the Imaging Performance of Security XRay Systems", ASTM Designation, ASTM International, US, No. F972-08, Jan. 1, 2001 (Jan. 1, 2001 ), pp. 603-608, XP008139092.
"American National Standard for Evaluation and Performance of Radiation Detection Portal Monitors for Use in Homeland Security; ANSI N42.35-2006 (Revision of ANSI N42.35-2004) ED—Anonymous", IEEE Standard; [IEEE Standard], IEEE, Piscataway, NJ, USA, Jan. 22, 2007 (Jan. 22, 2007), pp. c1-c35, XP017603946, ISBN: 978-0-7381-5282-0.
Supplementary European Search Report for PCT/AU2009/000820 mailed Feb. 28, 2014.
International Search Report for PCT/AU2009/000820 mailed Aug. 12, 2009.

* cited by examiner

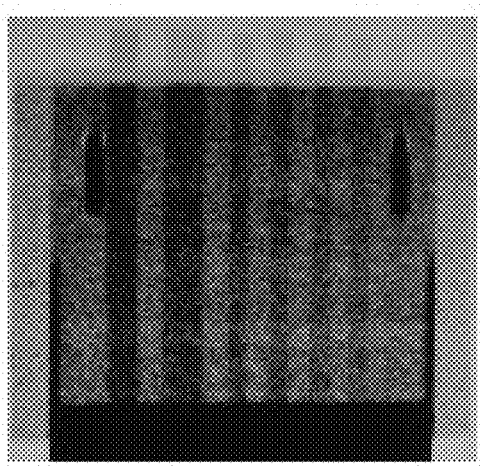 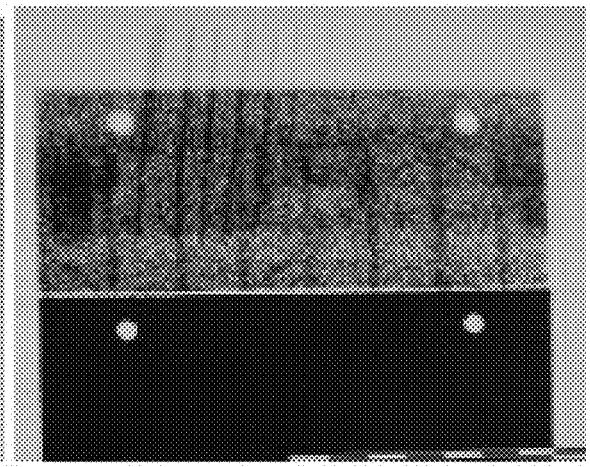
FIG. 5(A)　　　　　　　FIG. 5(B)
FIG. 5(C)

| MANUFACTURER | MODEL | SERIAL NUMBER | ENERGY (MeV) | MATERIALS DISCRIMINATION (DUAL ENERGY?) | VIEW (SINGLE/DUAL) | ANGLE OF BEAM TO HORIZONTAL |
|---|---|---|---|---|---|---|
|  |  |  |  |  |  |  |

FIG. 26

| WIRE DIAMETER (mm) | 10 | 8 | 6 | 5 | 4 | 3.2 | 2.4 | 1.6 | 0.9 | TOTAL /9 |
|---|---|---|---|---|---|---|---|---|---|---|
|  |  |  |  |  |  |  |  |  |  |  |

FIG. 27

| WIRE DIAMETER (mm) | 10 | 8 | 6 | 5 | 4 | 3.2 | 1.6 | 0.9 | TOTAL /9 |
|---|---|---|---|---|---|---|---|---|---|
| THICKNESS STEEL (mm) | | | | | | | | | |
| 10 | | | | | | | | | |
| 20 | | | | | | | | | |
| 30 | | | | | | | | | |
| 40 | | | | | | | | | |
| 50 | | | | | | | | | |
| 60 | | | | | | | | | |
| 70 | | | | | | | | | |
| IQI for maximum steel sheet thickness = | | | | | | | | | |
| TOTAL (/45) = | | | | | | | | | |

FIG. 28

| PLATE THICKNESS (mm) | 2.5 | 5 | 10 | 20 | 40 | TOTAL /5 |
|---|---|---|---|---|---|---|
| THICKNESS STEEL (mm) | | | | | | |
| 10 | | | | | | |
| 40 | | | | | | |
| 50 | | | | | | |
| 60 | | | | | | |
| 70 | | | | | | |
| 80 | | | | | | |
| CS for minimum plate thickness = | | | | | | |
| PENETRATION (mm of steel) = | | | | | | |

FIG. 29

| Is the appearance of the organic items (Delrin® & MDF) different from the inorganic items? | | | | | | TOTAL /2 |
|---|---|---|---|---|---|---|
| | | | | | | |

| IN AIR | | | | | | |
|---|---|---|---|---|---|---|
| DELRIN® THICKNESS (mm) | 10 | 20 | 40 | 80 | | TOTAL /4 |
| | | | | | | |
| MDF THICKNESS (mm) | 5 | 10 | 20 | 40 | 80 | TOTAL /5 |
| | | | | | | |
| TOTAL OF DISCIMINATED STEPS (/9) = | | | | | | |

FIG. 30

| MDF THICKNESS (mm) | 5 | 10 | 20 | 40 | 80 | TOTALS /5 |
|---|---|---|---|---|---|---|
| DELRIN® THICKNESS (mm) | | | | | | |
| 10 | | | | | | |
| 20 | | | | | | |
| 40 | | | | | | |
| 80 | | | | | | |
| TOTAL OF DISCRIMINATED STEPS (/20) = | | | | | | |
| | | | | | | |

OVERALL TOTAL =

FIG. 31

| MANUFACTURER | MODEL | SERIAL NUMBER | ENERGY (MeV) | MATERIALS DISCRIMINATION (DUAL ENERGY?) | VIEW (SINGLE/DUAL) | ANGLE OF BEAM TO HORIZONTAL |
|---|---|---|---|---|---|---|
| D | xyz | | 0.450 | DUAL | DUAL | 25 |

FIG. 32

| WIRE DIAMETER (mm) | 10 | 8 | 6 | 5 | 4 | 3.2 | 2.4 | 1.6 | 0.9 | TOTAL /9 |
|---|---|---|---|---|---|---|---|---|---|---|
| | X | X | X | X | X | X | X | X | X | 9 |

FIG. 33

| WIRE DIAMETER (mm) | 10 | 8 | 6 | 5 | 4 | 3.2 | 1.6 | 0.9 | TOTAL /9 |
|---|---|---|---|---|---|---|---|---|---|
| THICKNESS STEEL (mm) | | | | | | | | | |
| 10 | X | X | X | X | X | X | X | | 7 |
| 20 | X | X | X | X | X | X | X | | 7 |
| 30 | X | X | X | X | X | X | X | | 7 |
| 40 | X | X | X | X | X | X | X | | 7 |
| 50 | X | X | X | X | X | X | | | 6 |
| 60 | | | | | | | | | |
| 70 | | | | | | | | | |

IQI for maximum steel sheet thickness = 0.064

TOTAL (/45) = 34

FIG. 34

| PLATE THICKNESS (mm) | 2.5 | 5 | 10 | 20 | 40 | TOTAL /5 |
|---|---|---|---|---|---|---|
| THICKNESS STEEL (mm) | | | | | | |
| 10 | X | X | X | X | X | 5 |
| 40 | X | X | X | X | X | 5 |
| 50 | X | X | X | X | X | 5 |
| 60 | X | X | X | X | X | 5 |
| 70 | X | X | X | X | X | 5 |
| 80 | | X | X | X | X | 4 |
| CS for minimum plate thickness = 0.063 | | | | | | |
| TOTAL (25) = 24 | | | | | | |
| PENETRATION (mm of steel) = 90 | | | | | | |

FIG. 35

| Is the appearance of the organic items (Delrin® & MDF) different from the inorganic items? | TOTAL /2 |
|---|---|
|  | 2 |

| IN AIR | | | | | | |
|---|---|---|---|---|---|---|
| DELRIN® THICKNESS (mm) | 10 | 20 | 40 | 80 |  | TOTAL /4 |
|  | x | X | X |  |  | 3 |
| MDF THICKNESS (mm) | 5 | 10 | 20 | 40 | 80 | TOTAL /5 |
|  |  |  |  |  |  | 0 |
| TOTAL OF DISCIMINATED STEPS (/9) = 3 | | | | | | |

FIG. 36

| MDF THICKNESS (mm) | 5 | 10 | 20 | 40 | 80 | TOTALS /5 |
|---|---|---|---|---|---|---|
| DELRIN® THICKNESS (mm) | | | | | | |
| 10 | | | | | | 0 |
| 20 | | | | | | 0 |
| 40 | | | | | | 0 |
| 80 | | | | | | 0 |
| TOTAL OF DISCRIMINATED STEPS (/20) = 0 | | | | | | |

OVERALL TOTAL = 72/110

FIG. 37

| MANUFACTURER | MODEL | SERIAL NUMBER | ENERGY (MeV) | MATERIALS DISCRIMINATION (DUAL ENERGY?) | VIEW (SINGLE/DUAL) | ANGLE OF BEAM TO HORIZONTAL |
|---|---|---|---|---|---|---|
| D | xyz | | 0.450 | DUAL | DUAL | 90 |

FIG. 38

| WIRE DIAMETER (mm) | 10 | 8 | 6 | 5 | 4 | 3.2 | 2.4 | 1.6 | 0.9 | TOTAL /9 |
|---|---|---|---|---|---|---|---|---|---|---|
| | X | X | X | X | X | X | X | X | X | 9 |

FIG. 39

| WIRE DIAMETER (mm) | 10 | 8 | 6 | 5 | 4 | 3.2 | 1.6 | 0.9 | TOTAL /9 |
|---|---|---|---|---|---|---|---|---|---|
| THICKNESS STEEL (mm) | | | | | | | | | |
| 10 | X | X | X | X | X | X | X | | 7 |
| 20 | X | X | X | X | X | X | X | | 7 |
| 30 | X | X | X | X | X | X | X | | 7 |
| 40 | X | X | X | X | X | X | X | | 7 |
| 50 | X | X | X | X | X | X | | | 6 |
| 60 | | | | | | | | | |
| 70 | | | | | | | | | |
| IQI for maximum steel sheet thickness = 0.06 | | | | | | | | | |
| TOTAL (/45) = 34 | | | | | | | | | |

FIG. 40

| PLATE THICKNESS (mm) | 2.5 | 5 | 10 | 20 | 40 | TOTAL /5 |
|---|---|---|---|---|---|---|
| THICKNESS STEEL (mm) | | | | | | |
| 10 | X | X | X | X | X | 5 |
| 40 | X | X | X | X | X | 5 |
| 50 | X | X | X | X | X | 5 |
| 60 | X | X | X | X | X | 5 |
| 70 | X | X | X | X | X | 5 |
| 80 | X | X | X | X | X | 5 |
| CS for minimum plate thickness = 0.03 | | | | | | |
| TOTAL (25) = 25 | | | | | | |
| PENETRATION (mm of steel) = 90 | | | | | | |

FIG. 41

| Is the appearance of the organic items (Delrin® & MDF) different from the inorganic items? | | | | | | TOTAL /2 |
|---|---|---|---|---|---|---|
| | | | | | | 2 |

| IN AIR | | | | | | |
|---|---|---|---|---|---|---|
| DELRIN® THICKNESS (mm) | 10 | 20 | 40 | 80 | | TOTAL /4 |
| | X | X | X | X | | 4 |
| MDF THICKNESS (mm) | 5 | 10 | 20 | 40 | 80 | TOTAL /5 |
| | | | | | | 0 |
| TOTAL OF DISCIMINATED STEPS (/9) = 3 | | | | | | |

FIG. 42

| MDF THICKNESS (mm) | 5 | 10 | 20 | 40 | 80 | TOTALS /5 |
|---|---|---|---|---|---|---|
| DELRIN® THICKNESS (mm) | | | | | | |
| 10 | | | X | X | X | 3 |
| 20 | | | X | X | X | 3 |
| 40 | | | | X | X | 2 |
| 80 | | | | X | X | 2 |
| TOTAL OF DISCRIMINATED STEPS (/20) = 1 0 | | | | | | |

OVERALL TOTAL = 80/110

FIG. 43

| MANUFACTURER | MODEL | SERIAL NUMBER | ENERGY (MeV) | MATERIALS DISCRIMINATION (DUAL ENERGY?) | VIEW (SINGLE/DUAL) | ANGLE OF BEAM TO HORIZONTAL |
|---|---|---|---|---|---|---|
| A | xyz | | 6 | NONE | SINGLE | 19 |

FIG. 44

| WIRE DIAMETER (mm) | 10 | 8 | 6 | 5 | 4 | 3.2 | 2.4 | 1.6 | 0.9 | TOTAL /9 |
|---|---|---|---|---|---|---|---|---|---|---|
| | X | X | X | X | | | | | | 4 |

FIG. 45

| WIRE DIAMETER (mm) | 10 | 8 | 6 | 5 | 4 | 3.2 | 1.6 | 0.9 | TOTAL /9 |
|---|---|---|---|---|---|---|---|---|---|
| THICKNESS STEEL (mm) | | | | | | | | | |
| 10 | X | X | X | X | X | X | | | 6 |
| 20 | X | X | X | X | X | X | | | 6 |
| 30 | X | X | X | X | X | X | | | 6 |
| 40 | X | X | X | X | X | X | | | 6 |
| 50 | X | X | X | X | X | | | | 5 |
| 60 | | | | | | | | | |
| 70 | | | | | | | | | |
| IQI for maximum steel sheet thickness = 0.10 | | | | | | | | | |
| TOTAL (/45) = 29 | | | | | | | | | |

FIG. 46

| PLATE THICKNESS (mm) | 2.5 | 5 | 10 | 20 | 40 | TOTAL /5 |
|---|---|---|---|---|---|---|
| THICKNESS STEEL (mm) | | | | | | |
| 10 | X | X | X | X | X | 5 |
| 40 | X | X | X | X | X | 5 |
| 50 | X | X | X | X | X | 5 |
| 60 | X | X | X | X | X | 5 |
| 70 | X | X | X | X | X | 5 |
| 80 | X | X | X | X | X | 5 |
| CS for minimum plate thickness = 0.03 | | | | | | |
| TOTAL (25) = 25 | | | | | | |
| PENETRATION (mm of steel) = >120 | | | | | | |

FIG. 47

| Is the appearance of the organic items (Delrin® & MDF) different from the inorganic items? | | | | | | TOTAL /2 |
|---|---|---|---|---|---|---|
| | | | | | | 0 |

| IN AIR | | | | | | |
|---|---|---|---|---|---|---|
| DELRIN® THICKNESS (mm) | 10 | 20 | 40 | 80 | | TOTAL /4 |
| | X | X | X | X | | 4 |
| MDF THICKNESS (mm) | 5 | 10 | 20 | 40 | 80 | TOTAL /5 |
| | | | | | | 0 |
| TOTAL OF DISCIMINATED STEPS (/9) = 4 | | | | | | |

FIG. 48

| MDF THICKNESS (mm) | 5 | 10 | 20 | 40 | 80 | TOTALS /5 |
|---|---|---|---|---|---|---|
| DELRIN® THICKNESS (mm) | | | | | | |
| 10 | | | X | X | X | 3 |
| 20 | | | X | X | X | 3 |
| 40 | | | | X | X | 2 |
| 80 | | | | X | X | 2 |
| TOTAL OF DISCRIMINATED STEPS (/20) = 10 | | | | | | |

OVERALL TOTAL = 72/110

FIG. 49

IMAGING TEST PIECE FOR MEDIUM AND LARGE SECURITY X-RAY SCANNERS

This application is a U.S. national phase application pursuant to 35 U.S.C. 371 of International Application No. PCT/AU2009/000820, filed Jun. 25, 2009, which claims priority to Australian Patent Application No. 20088903226, filed Jun. 25, 2008, disclosures of each of which are incorporated by reference herein

TECHNICAL FIELD

The present invention relates to an imaging test piece for an x-ray device for use in cargo screening by X-ray image analysis

BACKGROUND OF THE INVENTION

Until recently the specifications provided for X-ray examination systems by suppliers to the tender evaluation process has been minimal. This information typically includes only:
single wire resolution in air (perhaps, 32 American wire gauge (AWG))
penetration of steel (perhaps 90 mm for a 450 kiloelectron volts (keV) system)
Reading onwards in the specifications one might find that the system is capable of materials discrimination and even automatic explosives detection, and that software exists to enable this to be done.

No standard test piece for the evaluation of the performance of medium and large tunnel (pallet and container) X-ray examination systems presently exists.

Since 2002, however, the Australian Customs Service (ACS) has, for cabinet machines (tunnel sizes of 1000 mm×1000 mm, and operating X-ray energies of around 160 keV) been using data collected form the examination of an American Society for Testing and Materials (ASTM) F 792-01E2 standard suitcase to determine objectively the performance of the X-ray system. FIG. 1 shows the construction of the standard suitcase, and FIG. 2 is an X-ray image taken of the system using a dual energy cabinet X-ray system operating at 140 keV.

The function of each of the various tests is set out in Table 1.

TABLE 1

The function of each of the tests in the standard suitcase are noted.

TEST COMMENT

1  Check for visibility of wires in air (24 to 38 AWG)
2  Check for visibility of TEST 1 wires behind a step wedge (9, 5, 15.9, 22.2 mm)
3  Check resolution of wire bundles (bundles of four wires with the wires in each bundle being 2, 1.6. 1.4. 1.0 mm)
4  Penetration test (steel stepwedge, lead letters denoting the wedge thickness in mm)
5  Plastic samples of the same thickness, which must be discriminated one from the other
6  Contrast sensitivity tests for plastic and metal blocks. Holes of different diameters and depths in the blocks must be identified.
7  Materials discrimination: the system must discriminate between plastic and metal objects with the same X-ray attenuation.
8  Materials discrimination: discrimination of adjacent organic objects.
9  Materials discrimination: discrimination of organic objects behind steel step wedges of thickness, 0, 0.16, 0.32, 9.48 mm A standard score sheet exists for evaluating the performance of the system (FIG. 3), and instructions are given to enable the score sheet to be filled out.

The performance of this system was evaluated to be 58%. It performed badly on Test 2, Test 3, half of Test 6, and did not meet manufacturer's specification for Test 1 and Test 4.

ASTM F 792-01E2 is a small case designed for small systems (e.g. hand luggage, or for machines with tunnel sizes up to 1000 mm wide) and is not useful for pallet and larger systems. It is also difficult to use as it has no angle adjustments to account for scanner contraction geometries. Equivalent test objects and score sheets do not exist for X-ray systems with tunnel to sizes greater than 1200 mm×1200 mm (pallet examination systems and exist). Several suppliers have given to the Australian Customs Service collections of rods, wires, and plates with minimal instruction as to how these are to be used to evaluate system performance. FIG. 4 shows one such arrangement, used for testing a dual view, dual energy 2.5 megaelectron volts (MeV) system at an ACS Container Examination Facility. An attempt has been made to compensate for the fact is that the axes of the horizontal and vertical X-ray fans are inclined at an angle to the horizontal.

To undertake the CS (Contrast Sensitivity) and IQI (Image Quality Index) tests plates were removed one at a time from the vertical plate stack and placed on the horizontal stack. The object had to be passed through the X-ray system each time the plate thicknesses were changed. The time taken to complete the examination procedure was in excess of six hours. Results for a single pass through the system are shown in FIG. 5.

It can be readily seen that the angle guessed for the X-ray beam inclination was too small as indicates by the black images of the bars which carry the plates (FIG. 5(*a*)). Interference from the plastic pallet on the images of the test wires can be seen in FIG. 5(*b*).

As well, conducting a penetration test using the vertical beam is compromised because of the fact that the "vertical" and "horizontal" beams are at least 20° inclined to vertical or horizontal lines which means that the beam path is increased, and the supporting pallet produces artefacts in the image. (FIG. 5(*c*)). The lead block (100 mm×100 mm×100 mm) is barely visible at the manufacturer's specification of 180 mm. An advantage of being able to tilt the test object is to place it on a true perpendicular intercept by the beam and minimise distortions and is inaccuracies induced by the interaction angle not being 90° to the beam (i.e. a kind of a parallax error). This is illustrated in FIG. 5*d*.

There is a need for a test piece for use in for X-ray systems with large tunnel sizes, e.g. greater than about 1000 mm×1000 mm.

OBJECT OF THE INVENTION

It is the object of the present invention to at least partially satisfy the above need.

SUMMARY OF THE INVENTION

In a broad form of the invention there is provided a test device for assessing the detection capability of an X-ray system with a large tunnel size, said device comprising a support having at least one test module mounted thereon, wherein said test module, or at least one of said test modules, is capable of being used in a test for an aspect of the detection capability. There may be a set of two test devices, each being according to the present invention. They may be provided as a set, or kit. The two test devices may be different. The two test devices may be capable of conducting the same tests. They may be capable of conducting different tests. Each may be capable of conducting at least one test which is capable of being conducted by the other and each may be capable of conducting at least one test which is not capable of being conducted by the other. They may, when used together, be capable of testing for tests corresponding to most, optionally all, of the tests described in ASTM F 792-01E2. The test device (or set of devices) of the invention may be capable of testing for one or more, optionally all, of: a materials discrimination test, a penetration test and a resolution test.

In a first aspect of the invention a test device is provided for assessing the detection capability of an X-ray system with a large tunnel size, said device comprising:
 a support capable of holding at least one test module;
 optionally a stand which holds the support at a predetermined angle to the horizontal; and
 at least one test module mounted on the support;
wherein said test module, or at least one of said test modules, is capable of being used in a test for an aspect of the detection capability.

The following options may be used in conjunction with the first aspect, either individually or in any suitable combination.

At least one of the test modules may comprise a wedge construction, e.g. a stepwedge construction. This may enable use of the test device in a wide range of X-ray tunnels. The test device may be suitable for use with X-ray systems of about 100 keV to about 10 MeV.

The test, or any one or more of the tests, may be one of the tests defined in ASTM F 792-01E2. It may be one of tests 1 to 9 as defined in ASTM F792-01. The test device may be capable of being used in all of tests 1 to 9 as defined in ASTM F792-01. The test may be selected from the group consisting of wire resolution in air, wire resolution between steel, contrast sensitivity and materials discrimination. The test device may comprise at least two test modules, each being capable of testing a different test. Each test, or any one or more of the tests, may be as defined in ASTM F 792-01E2. In one embodiment the test device comprises a test module capable of testing wire resolution in air, a test module capable of testing wire resolution between steel, a test module capable of testing contrast sensitivity and a test module capable of testing materials discrimination. In the present specification, reference to a test as defined in ASTM F 792-01E2 may be to a test based on a test in ASTM F 792-01E2 but suitably modified to account for differences in energy and size of a scanner in which the test piece is designed to be used.

The test device may be of a size such that it is capable of passing through an examination tunnel of dimension 1300 mm×1300 mm. It may be of a size such that it is capable of being mounted on a standard 1200 mm×1200 mm pallet.

The stand may comprise a rotatable holder for holding the support so as to enable the predetermined angle to be varied. It may comprise a latching mechanism to lock the support so as to maintain the at least one test module at the predetermined angle.

The test module(s) or one or more components thereof may be removable from the support.

The test(s) may be conducted on the test device using a single pass of the test device through an examination tunnel of the X-ray system in the case where the X-ray system is a single view X-ray system or using two passes through an examination tunnel of the X-ray system in the case where the X-ray system is dual view system.

The test device may be useful for assessing the performance or detection capability of an X-ray system of about 100 keV to about 450 keV, or of about 100 keV to about 1 MeV, or of about 1 MeV to about 10 MeV.

In some embodiments the tunnel size is sufficiently large to scan a standard shipping container. In this case the device may comprise a modified shipping container. The modified shipping container may have the same external dimensions as a standard shipping container. The support and at least one test module may be disposed within the modified shipping container. The modified shipping container may comprise double doors at one end, or at both ends (i.e. at either end) for inserting or removing the at least one test module into or from said container. The modified shipping container has at least a portion of at least one (optionally more) of its walls made of a plastic that is substantially transparent to X-rays. The portion may be such that, in use, X-rays passing from an X-ray source through at least one of the test modules pass through said plastic in order to reach an X-ray detector. In this context, "walls" also includes the floor and ceiling of the container. Alternatively, the device may comprise a collection of one or more test modules which are locatable within a shipping container, optionally a modified shipping container as described above. As a further alternative, the modules may be located, or locatable, on a vehicle, e.g. a truck, which is of sufficient size to pass through the tunnel of an X-ray tunnel suitable for examining standard sized shipping containers.

The test device may additionally comprise a radioactive source for testing a capability of a radiation portal for detection of a radioactive substance. The radioactive source may comprise potassium-40 (e.g. as $^{40}$KCl, commonly available as KCl chemical, although other salts or compounds of potassium-40 may be used, e.g. other halides such as fluoride, bromide or iodide, or mixtures of such substances) or caesium-137 (Cs-137). The activity of potassium-40 (K-40) in natural potassium is 30.18+/−0.72 Bq/g (Samat S. B., Green S., Beddoe A. H. "The $^{40}$K activity of one gram of potassium". Phys. Med. Biol. 42 (1997) 407-413).

The test device for use with a tunnel of size sufficiently large to scan a standard shipping container may comprise at least three independently movable test modules. They may each independently be selected from the group consisting of a materials discrimination module, a resolution module and a penetration module. The penetration and material discrimination modules may each, independently, comprise a plurality of independently rotatable elements. Each of these elements may be in the form of a wedge comprising a plurality of plates (e.g. metal plates) so as to form a device capable of presenting a number of discrete different thicknesses to X-rays passing therethrough. Each of the rotatable elements may independently lockable into a desired orientation.

In an embodiment of the invention a test device is provided for assessing the detection capability of an X-ray system with a large tunnel size, said device comprising:
 is a support capable of holding at least one test module;
 a stand which holds the support at a predetermined angle to the horizontal;
 a rotatable holder for holding the support so as to enable the predetermined angle to be varied; and
 at least one test module mounted on the support capable of conducting a test selected from tests 1 to 9 as defined in ASTM F 792-01E2;

said test device being of a size such that it is capable of being mounted on a standard 1200 mm×1200 mm pallet.

In another embodiment a test device is provided for assessing the detection capability of an X-ray system with a large tunnel size, said device comprising:
  a support capable of holding at least one test module;
  a stand which holds the support at a predetermined angle to the horizontal;
  a rotatable holder for holding the support so as to enable the predetermined angle to be varied; and
  test modules mounted on the support capable of conducting each of tests 1 to 9 as defined in ASTM F 792-01E2 using a single pass of the test device through an examination tunnel of the X-ray system in the case where the X-ray system is a single view X-ray system or using two passes through an examination tunnel of the X-ray system in the case where the X-ray system is dual view system;
said test device being of a size such that it is capable of being mounted on a standard 1200 mm×1200 mm pallet.

In another embodiment a test device is provided for assessing the detection capability of an X-ray system which is sufficiently large to scan a standard shipping container, said device comprising:
  a modified shipping container having the same external dimensions as a standard shipping container;
  a penetration module comprising a plurality of independently rotatable metal wedges which are lockable into a desired orientation;
  a material discrimination module;
  a resolution module; and
  optionally a source of radioactivity;
said penetration module, material discrimination module and resolution module being independently transportable, and wherein the penetration module, the material discrimination module and the resolution module and, if present, the source of radioactivity, are disposed inside said modified shipping container, and wherein at least a portion of at least one (optionally more) of the walls of said container are a plastic that is substantially transparent to X-rays such that, in use, X-rays passing from an X-ray source through the material discrimination module pass through said plastic in order to reach an X-ray detector.

In a second aspect of the invention a method is provided for assessing the detection capability of an X-ray system with a large tunnel size, said method comprising:
  passing a test device according to the first aspect of the invention through an examination tunnel of said X-ray system so as to expose the test module(s) to X-rays from said system; and
  detecting X-rays, if any, that pass through the test module(s), using the X-ray system so as to generate an image;
  determining one or more test results from the image; and
  assessing the operation of the X-ray system using the test result(s).

The following options may be used in conjunction with the second aspect, either individually or in any suitable combination.

In the event that the test device comprises a rotatable holder for holding the support, the method may comprise varying the angle of the support to the predetermined angle using the rotatable holder. In the event that the test device additionally comprises a latching mechanism to lock the support, the method may additionally comprise locking the support by means of the latching mechanism so as to maintain the at least one test module at the predetermined angle. The step of varying the angle may be conducted before passing the test device through the tunnel. It may be conducted while passing the device through the tunnel.

The test results, or any one or more thereof, may be test results for tests 1 to 9 as defined in ASTM F 792-01E2. They may comprise one or more, optionally all, of: a materials discrimination test, a penetration test and a resolution test.

If the X-ray system is a single view X-ray system the test device may be passed through the tunnel exactly once. If the X-ray system is dual view system, the test device may be passed through the tunnel exactly twice.

The test device may comprise at least two test modules, each being capable of testing a different test. The step of assessing may comprise aggregating the test results into a single aggregate score and assessing the operation of the operation of the X-ray system using the aggregate score. The step of aggregating may comprise adding the test results to obtain the single aggregate score. The step of aggregating the test results may be performed on a computer.

In an embodiment a method is provided for assessing the detection capability of an X-ray system with a large tunnel size, said method comprising:
  passing a test device according to the first aspect of the invention through an examination tunnel of said X-ray system so as to expose the test module(s) to X-rays from said system; and
  detecting X-rays, if any, that pass through the test module(s), using the X-ray system so as to generate an image;
  determining one or more test results from the image; and
  assessing the operation of the X-ray system using the test result(s);
wherein if the X-ray system is a single view X-ray system the test device is passed through the tunnel exactly once and if the X-ray system is dual view system, the test device is passed through the tunnel exactly twice.

In another embodiment a method is provided for assessing the detection capability of an X-ray system with a large tunnel size, said method comprising:
  passing a test device according to the first aspect of the invention through an examination tunnel of said X-ray system so as to expose the test module(s) to X-rays from said system; and
  detecting X-rays, if any, that pass through the test module(s), using the X-ray system so as to generate an image;
  determining at least two test results from the image;
  aggregating the test results into a single aggregate score; and
  assessing the operation of the operation of the X-ray system using the aggregate score;
wherein if the X-ray system is a single view X-ray system the test device is passed through the tunnel exactly once and if the X-ray system is dual view system, the test device is passed through the tunnel exactly twice.

In either of the both embodiments, the test results, or any one or more thereof, may be test results for tests 1 to 9 as defined in ASTM F 792-01E2.

In a third aspect of the invention there is provided the use of a test device according to the first aspect for assessing the operation of an X-ray system having a large tunnel size. There is also provided the use of a test device according to the first aspect for use in the method of the second aspect. There is also provided the test device according to the first aspect when used for assessing the operation of an X-ray system having a large tunnel size, or when used in the method of the second aspect.

In a fourth aspect of the invention there is provided a method for assessing the detection capability of a radiation portal with a large tunnel size, said method comprising:

passing a test device according to the first aspect through a radiation portal, said test device comprising a radioactive source;

determining whether a radiation detector of said portal can detect said radioactive source; and using said determining to assess said detection capability.

In an embodiment the tunnel size is sufficiently large to scan a standard shipping container. In this case, the test device may comprise a modified shipping container which has the same external dimensions as a standard shipping container. The support and at least one test module may be disposed within the modified shipping container.

In a fifth aspect of the invention there is provided a method of scanning an object using an X-ray system having a medium or large tunnel, said method comprising:

assessing the detection capability of an X-ray system according to the method of the second aspect;

if necessary, adjusting the X-ray system so as to improve its detection capability; and passing said object through said tunnel and scanning the object as it passes through said tunnel.

The method may comprise the step of forming an image of the scanned object and determining from said image the presence or absence of a certain class of object in the scanned object.

In a sixth aspect of the invention there is provided a system for scanning an object comprising:

an X-ray system having a medium or large tunnel, and having the capacity to form an image of a object scanned thereby; and a test device according to the invention.

The system may comprise a computer having software loaded thereon, said software being capable of enhancing a raw image obtained by said X-ray system of said scanned object so as to form the image.

BRIEF DESCRIPTION OF THE DRAWINGS

A preferred embodiment of the present invention will now be described, by way of an example only, with reference to the accompanying drawings wherein:

—FIG. 16 is the raw image, and FIG. 17 is an adjusted image.

FIG. 26 shows a scorecard header for an X-ray examination system ANSTO standard test piece version 2.

FIG. 27 shows a scorecard for Test 1 for wire visibility in air for an X-ray examination system ANSTO standard test piece version 2.

FIG. 28 shows a scorecard for Test 2 for wire visibility behind steel sheet (IQI) for an X-ray examination system ANSTO standard test piece version 2.

FIG. 29 shows a scorecard for Test 3 for contrast sensitivity (CS) (steel plates seen through sheet steel) for an X-ray examination system ANSTO standard test piece version 2.

FIG. 30 shows a scorecard for a scorecard for Test 4 for materials discrimination (step wedges of Delrin® and MDF), Test 4.1 for discrimination of organic from inorganic materials for an X-ray examination system ANSTO standard test piece version 2.

FIG. 31 shows a scorecard for Test 4 for materials discrimination (step wedges of Delrin® and MDF), Test 4.2 for identification of thickness steps in crossed MDF and Delrin® step wedges for an X-ray examination system ANSTO standard test piece version 2. A 10 mm steel sheet separates the Delrin® and the MDF stepwedges. Test 4.2 and Test 4.1 are also tests of backscatter performance if the test piece is used in a system with backscatter detectors.

FIG. 32 shows a scorecard header with information for an example test specimen for an X-ray examination system ANSTSO Standard Test Piece Version 2.

FIG. 33 shows example results for the test specimen of FIG. 32 in a scorecard for Test 1 for wire visibility in air for an X-ray examination system ANSTO standard test piece version 2.

FIG. 34 shows example results for the test specimen of FIG. 32 in a scorecard for Test 2 for wire visibility behind steel sheet (IQI) for an X-ray examination system ANSTO standard test piece version 2.

FIG. 35 shows example results for the test specimen of FIG. 32 in a scorecard for Test 3 for contrast sensitivity (CS) (steel plates seen through sheet steel) for an X-ray examination system ANSTO standard test piece version 2.

FIG. 36 shows example results for the test specimen of FIG. 32 in a scorecard for Test 4 for materials discrimination (step wedges of Delrin® and MDF), Test 4.1 for discrimination of organic from inorganic materials for an X-ray examination system ANSTO standard test piece version 2.

FIG. 37 shows example results for the test specimen of FIG. 32 in a scorecard for Test 4 for materials discrimination (step wedges of Delrin® and MDF), Test 4.2 for identification of thickness steps in crossed MDF and Delrin® step wedges for an X-ray examination system ANSTO standard test piece version 2. A 10 mm steel sheet separates the Delrin® and the MDF stepwedges. Test 4.2 and Test 4.1 are also tests of backscatter performance if the test piece is used in a system with backscatter detectors.

FIG. 38 shows a scorecard header with information for an example test specimen for an X-ray examination system ANSTSO Standard Test Piece Version 2.

FIG. 39 shows example results for the test specimen of FIG. 38 in a scorecard for Test 1 for wire visibility in air for an X-ray examination system ANSTO standard test piece version 2.

FIG. 40 shows example results for the test specimen of FIG. 38 in a scorecard for Test 2 for wire visibility behind steel sheet (IQI) for an X-ray examination system ANSTO standard test piece version 2.

FIG. 41 shows example results for the test specimen of FIG. 38 in a scorecard for Test 3 for contrast sensitivity (CS) (steel plates seen through sheet steel) for an X-ray examination system ANSTO standard test piece version 2.

FIG. 42 shows example results for the test specimen of FIG. 38 in a scorecard for Test 4 for materials discrimination (step wedges of Delrin® and MDF), Test 4.1 for discrimination of organic from inorganic materials for an X-ray examination system ANSTO standard test piece version 2.

FIG. 43 shows example results for the test specimen of FIG. 38 in a scorecard for Test 4 for materials discrimination (step wedges of Delrin® and MDF), Test 4.2 for identification of thickness steps in crossed MDF and Delrin® step wedges for an X-ray examination system ANSTO standard test piece version 2. A 10 mm steel sheet separates the Delrin® and the MDF stepwedges. Test 4.2 and Test 4.1 are also tests of backscatter performance if the test piece is used in a system with backscatter detectors.

FIG. 44 shows a scorecard header with information for an example test specimen for an X-ray examination system ANSTSO Standard Test Piece Version 2.

FIG. 45 shows example results for the test specimen of FIG. 44 in a scorecard for Test 1 for wire visibility in air for an X-ray examination system ANSTO standard test piece version 2.

FIG. 46 shows example results for the test specimen of FIG. 44 in a scorecard for Test 2 for wire visibility behind steel sheet (IQI) for an X-ray examination system ANSTO standard test piece version 2.

FIG. 47 shows example results for the test specimen of FIG. 44 in a scorecard for Test 3 for contrast sensitivity (CS) (steel plates seen through sheet steel) for an X-ray examination system ANSTO standard test piece version 2.

FIG. 48 shows example results for the test specimen of FIG. 44 in a scorecard for Test 4 for materials discrimination (step wedges of Delrin® and MDF), Test 4.1 for discrimination of organic from inorganic materials for an X-ray examination system ANSTO standard test piece version 2.

FIG. 49 shows example results for the test specimen of FIG. 44 in a scorecard for Test 4 for materials discrimination (step wedges of Delrin® and MDF), Test 4.2 for identification of thickness steps in crossed MDF and Delrin® step wedges for an X-ray examination system ANSTO standard test piece version 2. A 10 mm steel sheet separates the Delrin® and the MDF stepwedges. Test 4.2 and Test 4.1 are also tests of backscatter performance if the test piece is used in a system with backscatter detectors.

DETAILED DESCRIPTION OF PREFERRED EMBODIMENTS

Figure 1:
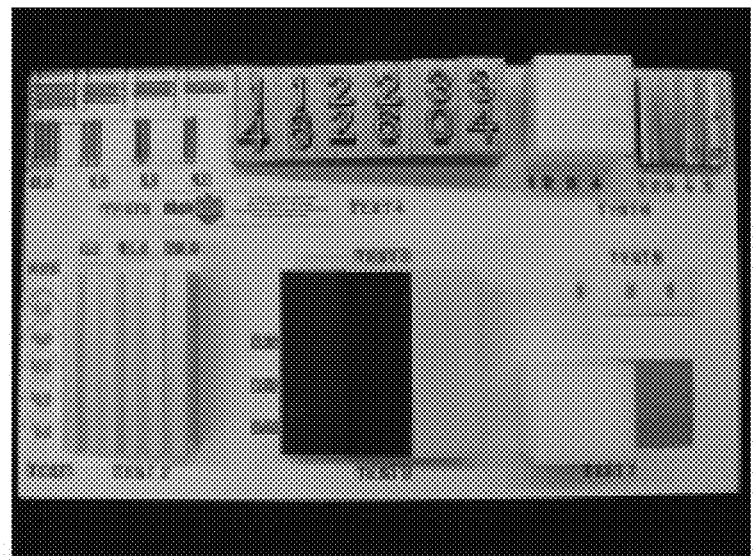
FIG. 1 shows the ASTM F 792-01E2 standard suitcase (referred to herein as the "ASTM suitcase"). Note that an aluminium stepwedge is sited behind the items in TEST 9.

The present invention relates to a test device, or to a set of test devices (e.g. a set of two test devices) for assessing the detection capability of an X-ray system with a large tunnel size. As discussed previously, no satisfactory test device is hitherto known. In this context, a "large" tunnel size may be considered to be one larger than about 1 m×1 m. In some contexts herein, the "large" tunnel size has been subdivided into "medium" (commonly about 1-1.3 m×1-1.3 m) and "large" (commonly greater than about 1.3×1.3 m, or about 1.3-2.4 m×1.3 m-2.4 m). It will be apparent from the context the intended meaning.

Apart from the size difference between the test piece of present invention and the ASTM suitcase, the present test piece in preferred embodiments is designed:
 a. to be transportable and capable of being moved around by forklift trucks without the need for assistance of pallets (i.e it is "forklift ready"),
 b. such that the system is self-contained (i.e. no pallet is required), so it can be used as is without any preparation,
 c. to be capable of being fine tuned with regard to vertical and horizontal test angles to suit any large tunnel X-ray scanner and thus optimise the angle-dependent tests, mark them and go back to the same settings each time it is used. This is important because a facility may have 2 or more scanners that are to be tested and these may have different angle specifications.
 d. to offer penetration tests up to 300 mm and still make the test piece capable of rotation and forklift-ready transport.

The ASTM suitcase standard (base plate) is made of plywood material. Simply scaling the ASTM system up in size to suit larger X-ray tunnels would require a change of material and therefore a change in the way the standard is constructed and presented. Also the ASTM suitcase has no facility for angle adjustments without addition of a support or stand, which would need to be made and provided by a user. The present test piece incorporates that facility as an integral feature. ASTM F 792-01E2 does not describe or address angle-related inaccuracies that may be induced. This is also the case for all home made systems, no matter what the size of the test piece is. The throughput speed achievable using the present test piece is a product of features described above.

The ASTM suitcase is unsuited for use in large and/or high energy X-ray systems, and would need to be substantially scaled up to be useful for scanner energies above 450 keV (typical of large systems) because penetration tests (and others) would be too small to be seen or to be adequate. The Scope section of ASTM F 792-01E2 states that the purpose of the ASTM case is to test instruments that are 1 m×1 m which typically have energies below 450 keV. The size of the ASTM suitcase is too small and it is not usable in cases where the conveyor is made from rollers (which are present in most large tunnels) without additional support.

Small size also limits the number of detectors that can be tested in a single pass.

The ASTM suitcase would be too small (almost invisible) and typically the penetration energies in medium and large tunnels are much too high. Consequently an image taken of the ASTM suitcase using a high energy X-ray tunnel will be washed out and have poor resolution. Additionally, not all the tests of the ASTM suitcase are suitable for large systems specifications without modification. For these reasons, the standard scope of ASTM F 792-01E2 defines its use for tunnels of 1 m by 1 m maximum.

Figure 1A:
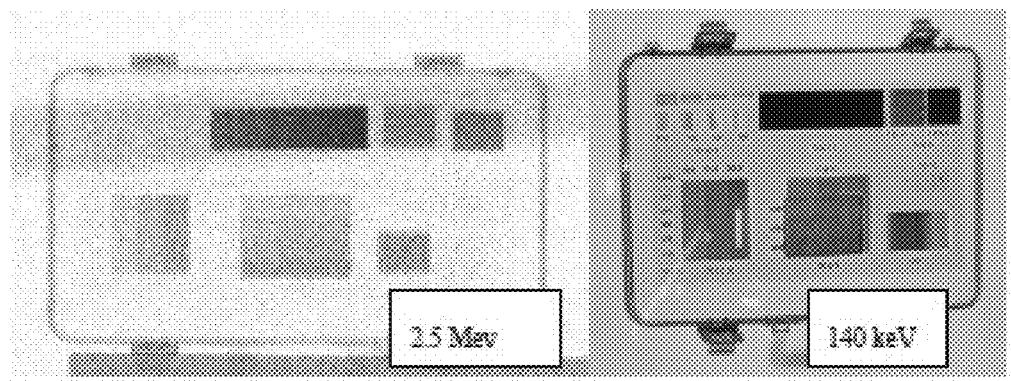
FIG. 1a shows scans of the standard ASTM suitcase of FIG. 1 using X-ray systems of different X-ray power. This demonstrates the poor performance of the ASTM suitcase on larger tunnel size X-ray scanners.
Figure 2:
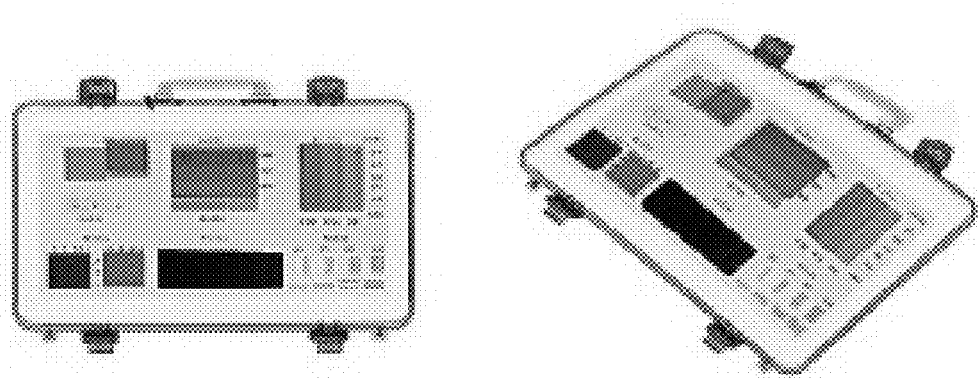
FIG. 2 shows X-ray images of the standard ASTM suitcase for two different orientations to the direction of travel. It should be recognised that the test case presentation to the x-ray beam also influences the test score of the scanning system. The system performance was evaluated to be 58%. It performed badly on Test 2, Test 3, half of test 6, and did not meet manufacturer's specification for Test 1 and Test 4. This demonstrates that the test object orientation in the beam has an influence on the quality of the image and therefore the need for standardisation of the standard positioning and presentation angle to the beam during the evaluation.
Figure 3:
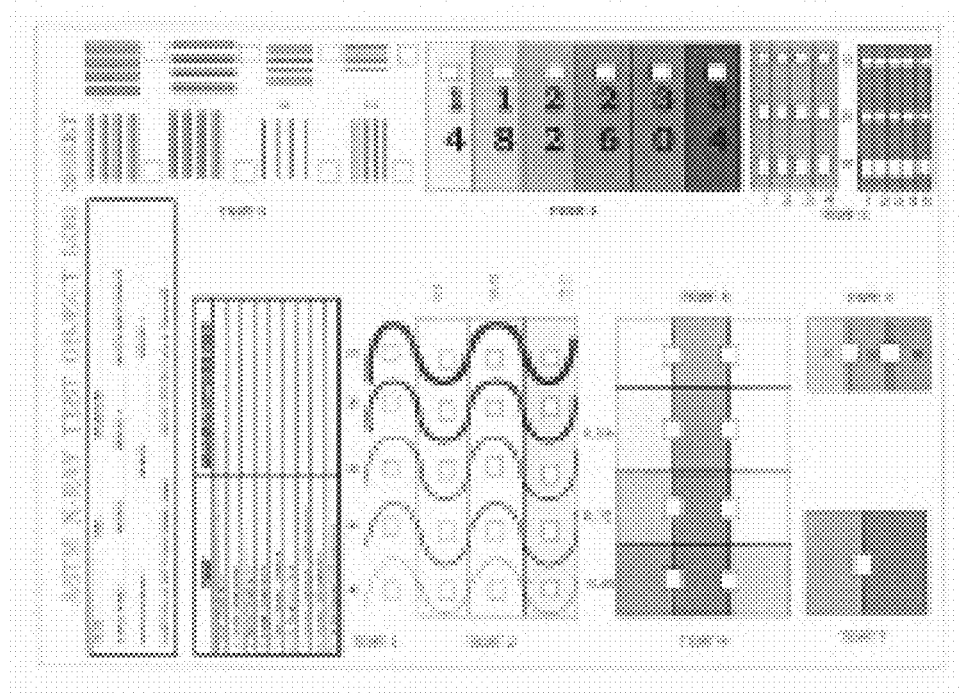
FIG. 3 shows an ASTM standard score sheet.
Figure 4:
FIG. 4 shows adjustment of the rods on a stack of steel sheets as part of the IQI test for the vertical view for the test piece of the present invention. The plates for the CS test for the horizontal view are shown in the foreground. The objects are carried on a standard wooden pallet.

FIG. 1a shows scans of the standard suitcase using 2.5 MeV and 140 keV. It is readily apparent that using 2.5 MeV, most resolution and material discrimination tests are not visible or able to be scored. This is due to the physical size of the test objects. The image taken using 140 keV shows a far more usable image, indicating that the standard suitcase is useful for the lower power systems for which it was designed, but not for larger and/or more powerful systems.

The device of the present invention comprises a support, e.g. a frame, having at least one test module mounted thereon. The support may be held by a stand. The stand, if present, supports the support. The test module, or at least one of said test modules, is capable of being used in a test for an aspect of the detection capability. The test module(s) may be of sufficient size and design for testing a large X-ray system, e.g. a system having a tunnel of at least about 1 m×1 m or at least about 1300×1300 mm or of about 1-1.3 m×1-1.3 m. It may be of sufficient size and design for testing an X-ray system that is too large for testing using the ASTM F 792-01E2 standard suitcase. It may be of sufficient size that it is unsuitable for use (or incapable of being used) in a tunnel of less than about 1 m×1 m. It may be of sufficient size and design that it is capable of conducting at least one, optionally more (or even all) of tests 1 to 9 as defined in ASTM F 792-01E2 but is unsuitable for use (or incapable of being used) in a tunnel of less than about 1 m×1 m. These tests may be modified in the test piece of the invention in order to account for the increased size of the tunnel to be tested. In preferred embodiments the stand allows rotation and provides a latching mechanism to lock the test object at a desired angle for presentation to either vertical or horizontal beam. The selected angles are machine dependent. The rotation mechanism may allow the support to be held in predetermined angles. The predetermined angles may be in increments of 0.5°, 1, 1.5, 2, 2.5, 3, 3.5, 4, 4.5 or 5°. The predetermined angle may be such as to improve or optimise sensitivity of at least one of the tests. It may be such as to improve or optimise resolution of at least one of the tests. The rotation mechanism may allow rotation of the test object. The rotation may be relative to the support of the test device. The rotation may be about a vertical axis or about a horizontal axis. The horizontal axis may be orthogonal to the intended direction of travel of the test device through an X-ray tunnel or it may be parallel to the intended direction of travel of the test device through an X-ray tunnel. The rotation mechanism may allow rotation about more than one, optionally two or all three, of these axes. The desired angle may be relative to the support of the test device. The desired angle may be an angle to a horizontal plane if the rotation is about a horizontal axis. It may be an angle to a vertical plane in the intended direction of travel of the test device through an X-ray tunnel if the rotation is about a vertical axis. The desired angle may be about 0 to about 90°, or about 0 to 45, 0 to 30, 0 to 20, 0 to 10, 30 to 90, 45 to 90, 60 to 90, 70 to 90, 80 to 90, 10 to 80, 30 to 60, 30 to 45, 45 to 60, 10 to 30 or 60 to 80°, e.g. about 10, 20, 30, 40, 45, 50, 60, 70, 80 or 90°. The angle may be predetermined by reference to the geometry of the X-ray tunnel through which the test device is to pass. It may be predetermined by reference to the angle of incident X-rays in the X-ray tunnel through which the test device is to pass. It may be predetermined by reference to test results obtained in earlier tests using the test device, or some other test device, in the X-ray tunnel through which the test device is to pass. The angle is preferably such that the test piece would not be viewed edge on. The test piece may have a vertical movement device to enable movement of one or more of the test modules vertically. This may enable the test module(s) to be located in a position where response is optimised, i.e. in a "sweet spot".

The test device (or set of devices) described herein may be capable of testing for one or more, optionally all, of: a materials discrimination test, a penetration test and a resolution test. The test module, or at least one of the test modules, is capable of being used a test of X-ray system performance, for example in a test as defined in ASTM 792-01E2 (the contents of which are incorporated herein by cross-reference) or a modified version of said test suitable for a medium or large tunnel X-ray scanner. ASTM F792-01E2 in section 5 defines a test object which is capable of performing a number of tests, defined in sections 5.2 to 5.10 of the standard. These tests are:

Test 1: wire display
Test 2: useful penetration
Test 3: spatial resolution
Test 4: simple penetration
Test 5: thin organic imaging
Test 6: IQI (image quality indicator) sensitivity
Test 7: organic/inorganic differentiation
Test 8: organic differentiation
Test 9: useful organic differentiation The test device may have one or modules capable of being used in at least one of these tests. As discussed elsewhere, these tests may be modified in the present test piece to account for the different size of X-ray tunnel, and optionally different X-ray energy, for which they are intended. In some embodiments, each module is used in only one test. In other embodiments a single module may have one or more region for use in one of the tests and a separate region for use in another of the tests. The test device may be capable of use in more than one test. It may be capable of use in any two or more of the above tests. It may be capable of use in all of the tests. It may be capable of use in a test that is not described in ASTM F792-01E2. In some embodiments, the test is wire resolution in air, wire resolution between steel, contrast sensitivity or materials discrimination.

One desirable feature of the test device is its wedge construction. This enables assessment of penetration of X-rays through different thicknesses of a material in a single pass of the device through an examination tunnel of an X-ray system.

Suitable test modules include the following:

Wire display (wire resolution in air)—a number of wires of different thicknesses. There may be for example about 5 to about 20 wires of different thicknesses, or about 5 to 10, 10 to 20 or 7 to 15 wires, e.g. 5, 6, 7, 8, 9, 10, 11, 12, 13, 14, 15, 16, 17, 18, 19 or 20 wires. They may be arranged in order of thickness. They may be straight. They may be zig-zag. They may be some other shape. The minimum wire thickness may be about 0.5 to about 2 mm, or about 0.5 to 1, 1 to 2 or 0.7 to 1.5 mm, e.g. about 0.5, 0.6, 0.7, 0.8, 0.9, 1, 1.1, 1.2, 1.3, 1.4, 1.5, 1.6, 1.7, 1.8, 1.9 or 2 mm. The maximum wire thickness may be about 5 to about 20 mm, or about 5 to 10, 10 to 20 or 7 to 15 mm, e.g. about 5, 6, 7, 8, 9, 10, 11, 12, 13, 14, 15, 16, 17, 18, 19 or 20 mm. The wire sizes may be evenly distributed between the minimum and the maximum or may be unevenly distributed between them.

IQI sensitivity (wire resolution between steel)—the wires as described above under "wire display) are provided and behind them is a step wedge. The step wedge has regions of different thicknesses so that the detectability of the wires can be determined through different thicknesses of the wedge. The wedge is commonly made of a metal for example steel. The minimum thickness of the wedge may be between about 5 and about 20 mm or about 5 to 10, 10 to 20 or 8 to 15 mm, e.g. about 5, 6, 7, 8, 9, 10, 11, 12, 13, 14, 15, 16, 17, 18, 19 or 20 mm. The maximum thickness of the wedge may be about 20 to about 50 mm, or about 20 to 40, 30 to 50 or 30 to 40 mm, e.g. about 20, 25, 30, 35, 40, 45 or 50 mm. There may be about 3 to about 10 steps, or about 3 to 5, 4 to 10 or 3 to 6 steps, e.g. 3, 4, 5, 6, 7, 8, 9 or 10 steps. The sizes of the steps may be evenly distributed between the minimum thickness and the maximum thickness or may be unevenly distributed between them. In some options this module may be combined with the wire display module, wherein a portion has no step wedge behind it (that portion being usable for testing wire display) and another having the step wedge behind it (for measuring IQI sensitivity).

Contrast sensitivity (CS)—this may comprise a step wedge, commonly of metal, e.g. steel. It is used to determine the ability of the system to detect X-ray intensity contrasts. Thus, since fewer X-rays will penetrate a thicker region of the wedge, the comparison between intensities detected through those different thicknesses provides a measure of the contrast sensitivity. The minimum thickness of the wedge may be between about 5 and about 20 mm or about 5 to 10, 10 to 20 or 8 to 15 mm, e.g. about 5, 6, 7, 8, 9, 10, 11, 12, 13, 14, 15, 16, 17, 18, 19 or 20 mm. The maximum thickness of the wedge may be about 50 to about 100 mm or about 50 to 80 m 70 to 100 or 60 to 80 mm, e.g. about 50, 55, 60, 65, 70, 75, 80, 85, 90, 95 or 100 mm. There may be about 3 to about 10 steps in the wedge, or about 3 to 5, 4 to 10 or 3 to 6 steps, e.g. 3, 4, 5, 6, 7, 8, 9 or 10 steps. The sizes of the steps may be evenly distributed between the minimum thickness and the maximum thickness or may be unevenly distributed between them.

Materials discrimination—a steel mounting plate has a step wedge of an organic, optionally polymeric, material (e.g. nylon or polyoxymethylene plastic, commonly referred to by its commercial name Delrin®) mounted thereon and overlapping it. The step wedge may have the same dimensions as described above under "contrast sensitivity". The overlap region may be used to determine the discrimination ability between organic and inorganic materials. Additionally it may be useful to determine contrast sensitivity through the organic material as separate to that through the metal used above. It may also be used to determine the performance of a backscatter facility in the X-ray system if present.

The test device may be of a size such that it is capable of passing through an examination tunnel of dimension 1300 mm×1300 mm. In order to meet this criterion, the device should have a maximum height of about 1250 mm. The maximum height may be about 500 to 1250, or 500 to 1000, 500 to 800, 800 to 1250, 1000 to 1250 or 800 to 1000 mm, e.g. about 500, 600, 700, 800, 900, 1000, 1100, 1200 or 1250 mm. It may have a maximum width or about 500 to 1250, or 500 to 1000, 500 to 800, 800 to 1250, 1000 to 1250 or 800 to 1000 mm, e.g. about 500, 600, 700, 800, 900, 1000, 1100, 1200 or 1250 mm. It may have either a width or a height or both that renders the device unsuitable for use (or incapable of use) in a cavity of 1 m×1 m or less. It may have either a width or a height or both that is at least about 900 mm, or at least about 950, 1000, 1050, 1100, 1150, 1200 or 1250 mm. It may have either a width or a height or both that is about 900 to about 1250 mm, or about 950 to 1250, 1000 to 1250, 1100 to 1250, 900 to 1200, 900 to 1100, 900 to 1000, 950 to 1200, 1000 to 1200, 1000 to 1100 or 1100 to 1200 mm. At least one of the width or height may be about 900, 950, 1000, 1050, 1100, 1150, 1200 or 1250 mm. The test device may have a height and width that are both at least about 10 cm smaller than the internal height and internal width respectively of an X-ray tunnel through which the test device is designed to pass (or in which it is designed to be used), or at least about 15, 20, 25, 30, 35, 40, 45 or 50 cm smaller, or about 10 to about 100 cm smaller or about 10 to 50, 10 to 30, 30 to 50, 50 to 100, 40 to 80 or 20 to 40 cm smaller, or about 10, 20, 30, 40, 50, 60, 70, 80, 90 or 100 cm smaller. In some instances either the width or the height of the test device may be more than 100 cm smaller than the corresponding dimension of the X-ray tunnel. In this instance, the other of the width or the height may be about 10 to about 100 cm smaller than the corresponding dimension of the X-ray tunnel. In this context, the height should be taken as the maximum vertical dimension of the test piece and the width as the maximum horizontal dimension orthogonal to the intended direction of travel of the test piece through an X-ray tunnel. A typical size would be height 1200 mm or 1250 mm and width about 1200 mm or 1250 mm. The height may be less than about 2000 mm, or less than about 1500 mm. The width may be less than about 2000 mm, or less than about 1500 mm. The height and width may each be between about 1000 and about 2000 mm or between about 1000 and 1500 mm or between about 1000 and 1300 mm or between 1000 and 1250 mm or between about 1100 and 1300 mm. It may be of a size such that it is capable of being mounted on a standard 1200 mm×1200 mm pallet. To meet this criterion (and the earlier criterion as well) it may have a maximum width of about 1200 mm, although in some cases it may overlap the pallet and may have a maximum width of up to about 1250 mm. The maximum width may be about 500 to 1250, 500 to 1200, 500 to 1000, 500 to 800, 800 to 1250, 1000 to 1250 or 800 to 1000 mm, e.g. about 500, 600, 700, 800, 900, 1000, 1100, 1200 or 1250 mm. The maximum length is preferably about 1200 mm, although it may overlap the pallet and may for example be up to about 1500 mm. Thus the maximum length may commonly be about 500 to 1250, 500 to 1200, 500 to 1000, 500 to 800, 800 to 1250, 1000 to 1250 or 800 to 1000 mm, e.g. about 500, 600, 700, 800, 900, 1000, 1100, 1200 or 1250 mm.

The test device is designed to be readily transportable. It may be readily transportable without being located on a separate support e.g. pallet. The stand or support may comprise an insertion region for inserting forklift forks or tines so that the test device is easily transportable using a forklift. In some embodiments a base of the stand comprises, or is made from, rectangular pipe (channel) which can accept forklift forks. Preferably the insertion region is designed so that the forklift forks can be inserted from either side of the stand (optionally from all four sides thereof). The insertion regions may be of suitable dimensions to accept a forklift tine. They may be of suitable dimensions that when the tines of a forklift are properly fitted into two of said regions, the forklift is capable of raising the device.

The stand may comprise a rotatable holder for holding the support so as to enable the predetermined angle to be varied. It is preferable that the X-rays incident on the test device impact the test module(s) approximately normally to the surface of the module(s) (or to the plane of the support). In order to be able to adjust to different directions of incident X-rays, it is preferable that the angle of the support be adjustable to achieve this normality. Thus the rotatable holder may be set to the desired angle. It may be lockable at the predetermined angle. The predetermined angle may be selected to suit a particular scanner beam angle or position. In some modes of operation it may be necessary to conduct preliminary experiments in order to optimize the angle of the support so as to obtain optimal test results. This may be conducted as part of the test, or it may be conducted as a separate operation prior to conducting the test.

The test module(s) may be removable from the frame. This enables damaged, worn or deteriorated test modules to be easily replaced. Also it enables the correct modules for the desired tests to be used. One of the useful properties of test piece is the ability to be used such that they do not have to be altered, modified or removed. Wedge designs are used to achieve this. Thus for example penetration may be tested from 10 mm to 300 mm when AUS1 (10 mm-100 mm) and AUS2 (100 mm-300 mm) are used without modifications. However, they may if required be removed or modified as described. Thus if only X-ray penetration is to be tested, all modules other than the X-ray penetration module may be removed. In some embodiments the test modules may be not removable, for example where it is known which tests are to be used. The test modules may be held in place by a restraining mechanism. This may for example comprise a clip, or it may comprise one or more screws or bolts, or it may comprise a magnet, or it may comprise some other restraining mechanism, or it may comprise more than one restraining mechanisms.

The test modules, when mounted on the support, may have no casing surrounding them. The support may have no casing surrounding it. The test modules, when mounted on the support, may have a casing at least surrounding them. The support may have a casing at least partially surrounding the support. The casing may be a shell. It may be an enclosure. It may be openable. It may be substantially transparent to X-rays. It may be made from a material that is substantially transparent to X-rays.

The test(s) may be conducted using the test device by using a single pass of the test device through an examination tunnel of the X-ray system in the case where the X-ray system is a single view X-ray system or by using two passes through an examination tunnel of the X-ray system in the case where the X-ray system is dual view system. In some instances a single view system may require more than one pass, e.g. 2, 3, 4 or 5 passes. In some instances a dual view system may require more than 2 passes, e.g. 4, 6, 8 or 10 passes. The total time for the test may be about 2 to about 20 minutes, or about 2 to 10, 2 to 5, 5 to 20, 10 to 20 or 5 to 10 minutes, e.g. about 2, 3, 4, 5, 6, 7, 8, 9, 10, 11, 12, 13, 14, 15, 16, 17, 18, 19 or 20 minutes. In some cases performance may be tested at various location on the conveyor belt of the X-ray tunnel, e.g. close to the source, centre and far from the source.

The test device may be useful for assessing the performance or detection capability of an X-ray system of at least about 100 keV, or at least about 150, 200, 250, 300, 350, 400, 450, 500, 600, 700, 800 or 900 keV, or at least about 1, 1.5, 2, 2.5, 3, 3.5, 4, 4.5, 5, 5.5, 6, 6.5, 7, 7.5, 8, 9 or 10 MeV, or about 100 keV to about 10 MeV, or about 100 to 1000 keV, 100 to 500 keV, 300 keV to 10 MeV, 500 keV to 10 MeV, 1 to 10 MeV, 2 to 10 MeV, 5 to 10 MeV, 1 to 6 MeV, 1 to 3 MeV, 3 to 8 MeV, 500 to 1000 keV, 300 to 800 keV or 450 to 700 keV, e.g. about 150, 200, 250, 300, 350, 400, 450, 500, 600, 700, 800 or 900 keV, or about 1, 1.5, 2, 2.5, 3, 3.5, 4, 4.5, 5, 5.5, 6, 6.5, 7, 7.5, 8, 9 or 10 MeV. In particular embodiments, the device may be useful for assessing the performance or detection capability of an X-ray system of up to about 450 keV or of about 160 to about 450 keV, or of greater than about 450 keV or of greater than about 1 MeV, or of about 450 keV to about 10 MeV, or of about 1 to about 10 MeV. It may be useful for assessing the performance or detection capability of an X-ray system of a system outside the above ranges.

The invention also relates to a method for using the test device for assessing the detection capability of an X-ray system with a large tunnel size or a medium tunnel size. The assessment of detection capability may relate to only one parameter or criterion of detection capability or to several thereof.

In the method, a test device according to the invention is passed through an examination tunnel of the X-ray system so as to expose the test module(s) to X-rays from said system. It is preferable that the angle of the support of the test device is such that the X-rays impact approximately normally (i.e. at right angles) to the test modules in order to obtain the best test results. The normal detection system and software of the X-ray system under test is then used to detect any X-rays that pass through the device (i.e. through the test module or modules) and to generate an image of the module(s). In some cases, in which the X-ray system is designed to detect backscattered X-rays, these may also be detected and imaged by the X-ray system. The image is then used to determine one or more test results. These may for example relate to the minimum contrast determinable by the system through steel, or through an organic material such as Delrin®. Other test results may relate to the ability to discriminate between organic materials and metals and the minimum wire thickness detectable by the system. The test results may then be used to assess the detection capability or performance of the X-ray system under test. The results may be used individually in order to assess the individual aspects of the detection capability, or they may be aggregated into a single aggregate score, or they may be used for both of these purposes. The aggregation may be performed manually, or may be performed automatically using a computer or similar device. A simple aggregation may comprise adding the individual results. Alternatively a more sophisticated algorithm may be used to obtain the aggregate score.

Thus in a sample method the test piece (or more than one test piece) are transferred to the conveyor of the X-ray tunnel by means of a fork lift. Angles of the test piece(s) are then adjusted angles to the desired value (taking about 5 minutes). The test piece(s) are then scanned in the X-ray tunnel (taking about 5 minutes) and the performance is then scored on a pro forma sheet (typically taking about 10 minutes). Thus the total time per test is about 20 minutes. The test pieces were designed to minimise handling and number of tests and maximise throughput.

If the X-ray system is a single view X-ray system it may be sufficient for the test device to be passed through the tunnel just once in order to obtain a satisfactory result. If the X-ray system is dual view system it may be sufficient for the test device to be passed through the tunnel exactly twice in order to obtain a satisfactory result. This minimises the test time. It will be understood that if required more passes may be used.

The results of the test (either individually or as an aggregate score) may be used in order to improve or optimise the operation of the X-ray system. In this event the X-ray system may be adjusted so as to improve its performance and then retested. This cycle may be repeated one or more times in order to optimise performance. The results may be used additionally or alternatively to optimise maintenance intervals for the X-ray system or to determine the need for maintenance thereof. Alternatively or additionally the results may be used to compare the performance of different X-ray systems. This may be useful when comparing different systems prior to purchase.

The present specification describes the construction and use of a test piece according to the present invention (referred to herein as the "ANSTO test piece", or simply "ANSTO", which may be either ANSTO AUS1 or ANSTO AUS2). The test piece of the present invention was designed so as to test as many aspects of X-ray system performance as possible in one pass of the test piece through the X-ray system, consistent with the requirement that the test piece could be carried on a standard pallet (1200 mm×1200 mm) and pass through an examination portal of 1300 mm×1300 mm. The test piece contained tests for: single wire resolution in air, wire resolution behind steel plates (Image Quality Index (IQI)), contrast sensitivity (CS), and materials discrimination.

A separate test piece has been designed to enable the testing of: wire bundle resolution behind various thicknesses of steel, penetration for systems operating above 450 keV, and materials discrimination for a wide range of organic materials, with and without screening by steel.

The test piece performed as designed, and the required comprehensive data on system performance was acquired in just one pass per view of the test piece through the X-ray examination systems. A scheme for recording the data from these tests, similar in nature to that for cabinet systems (tunnel sizes less than 100 mm×100 mm) using the ASTM F 792-01E2 test suitcase, has been devised.

Major design issues which are overcome by the present invention include:
  Design of test modules which are sufficiently compact and lightweight to be easily handled and maneuvered by standard forklifts and sufficiently large to be clearly visible on the image.
  Making the tests compact to fit inside the required cavity.
  Balancing the rotating test plate so that they can be safely revolved by hand and not allowing them to revolve under gravity on angle stetting latch release.
  Designing the test piece so that it can sit on a pallet or pallet like structure (to allow easy transport) and yet for that structure not to interfere with images taken in a vertical and horizontal view.
  Providing a self contained structure that does not require special shipping containers and pallets for transport and storage.

Because of the deficiencies of existing test procedures a test piece was designed by the present inventors. Version 1 of the test piece was evaluated at the ACS CEF at Osborne, South Australia using a dual view 2.5 MeV X-ray system. A test piece designed to test the performance of X-ray examination systems capable of examining standard pallets and larger objects was evaluated by the inventors.

Tests were made on the Dual View Pallet Search System (which operates at 450 keV) and Single View Container Search System (which operates at 6 MeV).

The test piece was designed to achieve the following objectives:
 1. enable most of the tests performed using the ASTM F 792-01E2 standard suitcase to be made in one pass of the test piece through a single view X-ray system and two passes through a dual view system
 2. provide, through use of a standard score sheet, an index which can be used as a measure of performance of the X-ray system
 3. be able to be mounted on a standard 1200 mm×1200 mm pallet
 4. be able to pass through examination tunnels of dimension 1300 mm×1300 mm
 5. be light enough to be moved easily by manpower
 6. be easy to transport, preferably in a 1 ton utility or van
 7. be able to be moved quickly from storage to machines to be tested using a forklift.

Figures 6A, 6B:
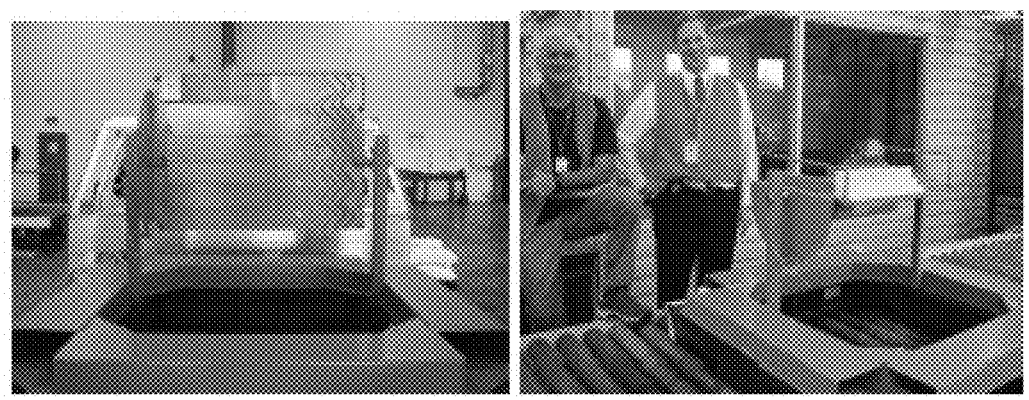
FIG. 6 shows (a) the test piece carried on the tray of a 1 ton utility, in its vertical mode, used for evaluating the performance of X-ray systems with quasi-horizontal X-ray median fan beams. The median beam is angled at around 20° upwards from the horizontal. (b) the test piece after passing through a dual beam X-ray System. It was set to test the performance of the vertical X-ray detection system, which in this case points vertically downwards.

FIG. 6(*a*) is a photograph of the front of the test piece on the tray of a 1 ton utility vehicle. The rest piece is constructed to be able to be lifted by a fork lift in two pairs of orthogonal directions. The semicircular disc on the left hand side of the test piece enables the test object to be set so that it is perpendicular to the median beam of the X-ray fan beam. The angle can be set from true vertical to horizontal in 2° steps.

In FIG. 7(*a*) at the top left of the test object is Test 1, wire resolution in air. The diameters of the wires are: 0.9, 1.6, 2.4, 3.2, 4, 5. 6, 8, 10 mm. This is similar to Test 1 in the ASTM standard suitcase, except that the ASTM suitcase uses wires up to 0.5 mm diameter, or 24 AWG, reflecting the smaller X-ray systems for which the ASTM suitcase is designed.

Below it is Test 2, wire resolution between steel (IQI test), in which the wires pass down the mounting plate (10 mm thick). Behind the mounting plate is a step wedge with steps of 10, 20, 30, 40 mm (FIG. 7(*b*)). Extra plates may be added to the step wedge to increase its overall thickness of the steps. This is similar to Test 2 in the ASTM standard suitcase, except that the ASTM suitcase has a fixed wedge. This provides the present test piece with increased versatility over the ASTM suitcase.

To the left of this is Test 3, which is a test of contrast sensitivity (CS). Mounted on the 10 mm thick steel mounting plate is a steel step wedge made up of 10 mm plates, in this case 30, 40, 50, 60, 70 mm thick. When the 10 mm thick mounting plate is added the step wedge has elements of thickness 10, 40, 50, 60, 70, 80 mm. Behind the mounting plate are attached steel plates the thicknesses of which are: 2.5, 5, 10, 20, 40 mm (FIG. 7(*b*)). This arrangement essentially performs the same function as Test 6 in the ASTM standard suitcase. It does not, however, test contrast sensitivity for plastics.

Test 4 is a test of materials discrimination, and evaluates many of the performance qualities tested in Tests 5, 7, 8, and 9 of the ASTM standard suitcase. A Delrin® step wedge which has steps of 80, 40, 20, 10 mm is mounted so as to overhang the 10 mm steel mounting plate. This performs three functions:

It enables the materials discrimination software to determine whether the object is organic or not (ASTM Test 7).

It provides a test of the visibility of steps and interfaces in the plastic (ASTM Test 5).

It provides a test of the performance of a backscatter X-ray system.

Attached behind the mounting plate is a Medium-density fiberboard (MDF) step wedge which has steps of thickness, 5, 10, 20, 40, and 80 mm. Alternatively the step plate may be made from high density polypropylene (HDPP), which is more robust than MDF and has similar X-ray absorption properties. As it happens this is not in its intended position. It is mounted so that it projected 25 mm above the mounting plate to give a second test of the materials discrimination software.

The polyoxymethylene plastic (Delrin®) and MDF are crossed step wedges separated by the 10 mm steel of the mounting plate. The system ought to be able to register this combined object as essentially organic, and as well each of the step edges should be resolved (similar, but not identical to, ASTM Test 9). This test will evaluate the performance of X-ray systems with a backscatter capability.

Figure 8:
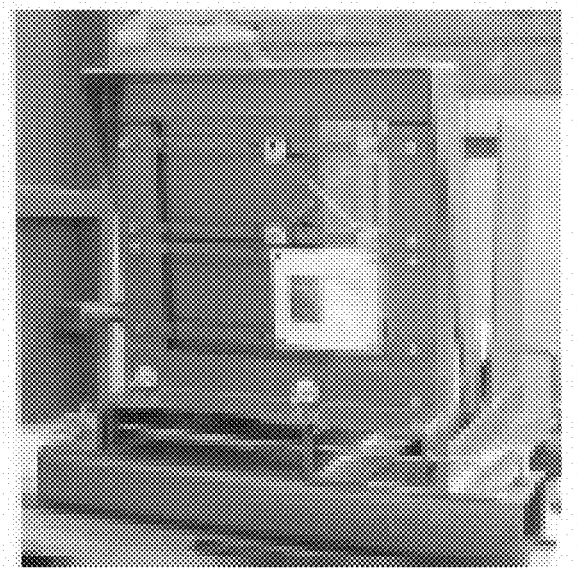
FIG. 8 shows a view of the IQI and resolution tests of the proposed American National Standards Institute (ANSI) 42.46 X-ray system test.

The US National Institute for Science and Technology is presently attempting to define an industry standard for testing the performance of large tunnel X-ray examination systems (ANSI 42.46). This standard is defined only for horizontal view systems, and is a more formal presentation of the ad hoc tests described above. FIGS. 8(*a*), 8(*b*), and 8(*c*) are photographs of various elements of the proposed ANSI 42.46 standard test piece. This test piece is of limited in usefulness and has available a restricted number of tests when compared with the test piece of the present invention. It is also difficult to use because it is cumbersome and more does not have a wedge based construction, thus making penetration tests (for example) difficult and lengthy.

The ANSI system allows for the orienting of the test object so that it is normal to the median beam of the X-ray fan, as does the ANSTO test piece. The adjustment steps are much coarser than for the ANSTO AUS1 test piece. The ANSI system is not configured to examine dual view systems: dual view compatibility is essential because most of the large tunnel systems in use in Australia are dual view systems. In contrast, the ANSTO AUS1 test piece is configured for use in dual beam systems.

The ANSI system enables the penetration of the X-ray beam to be determined (FIGS. 8(*a*) and 5(*b*). The arrow-shaped test object is made up of 50 mm thick plates of steel. The thickness of each of the screen plates is 25 mm.

Figure 5D:
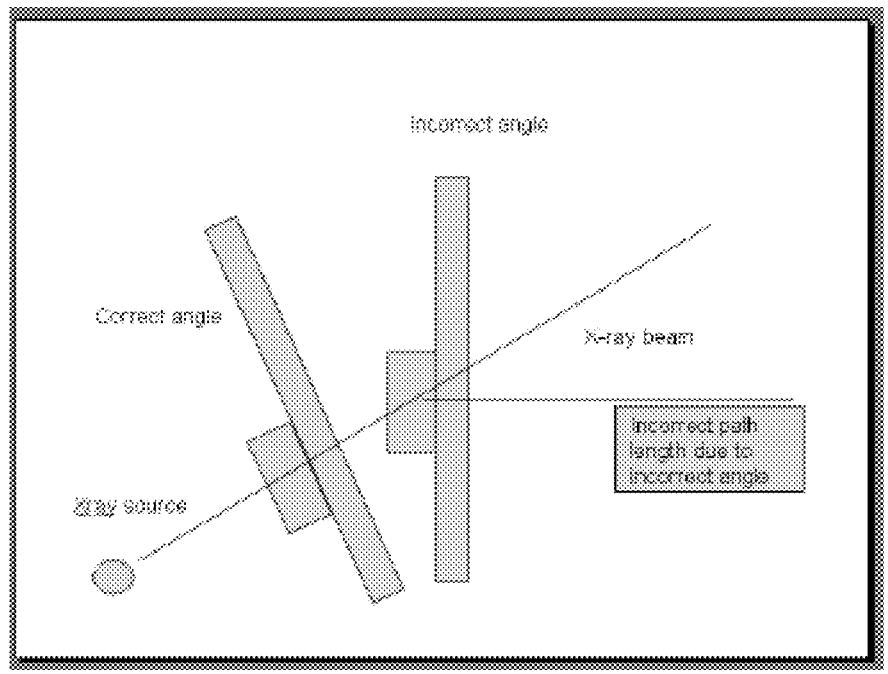
FIG. 5 shows (a) a horizontal view of the plates in the Contrast Sensitivity measurement: the 1 mm thick plate is barely visible; (b) a vertical view of the wires: the 2 mm diameter wire in air is barely visible; it cannot be seen behind the steel plates, but the 3 mm wire can be seen. Note the interference in the image caused by the plastic pallet on which the test object is mounted; (c) an image of a 100 mm×100 mm×100 mm lead block behind 180 mm steel (vertical view); (d) a diagram illustrating the advantage of tilting the test object.

In the past the definition of a meaningful penetration test accepted by most manufacturers has been the thickness of steel at which a 100 mm thick lead block placed behind the steel can be seen (FIG. 5(*c*)). This is meaningful if one is concerned with matters of radiation protection, but it is not helpful if the concern is with X-ray imaging.

Because one is interested in what material might be being screened, sufficient intensity must be left in the beam to enable some software manipulation of the image. Thus a more relevant definition might be: that thickness of steel screen material at which a steel object with a thickness 10% of the screen material can be seen, and have at least two grey scales of image manipulation possible.

For X-ray systems of 450 keV or less the ANSTO AUS1 test piece can be used for penetration tests. For example, if the manufacturer's specification were to be 90 mm of steel, the 40 mm steel sheet in front of the 80 mm section of the step wedge used for the Contrast Resolution (Test 3) should be clearly visible, since this exceeds the requirements for visibility given in the definition (33%, and two grey scales).

The ANSTO AUS1 test piece does not have the capability of testing penetration in X-ray systems of in the energy range above 450 keV. A companion test piece AUS2 has been developed to enable penetration tests in the range 1 to 6 MeV.

For systems which can detect backscattered radiation an arrow-shaped test object 100 mm thick is placed in front of one only of the 25 mm steel sheets on the side facing the incident X-ray beam.

To do this all the plates have to be removed from the frame, except one.

In contrast the ANSTO AUS1 test piece (Test4) places a Delrin® step wedge in front at the steel sheet, affording the opportunity of testing the ability of the back scatter system to detect different thicknesses of scattering materials.

As well, a deficiency in the conventional method of back scatter testing is that the object under investigation is on the same side of the steel screen as the source and the detector. This does not conform to what happens in practice: the object is concealed by objects which lie between the source and the detector.

This deficiency is redressed in the ANSTO AUS1 because the MDF step wedge lies behind a 10 mm thick steel sheet and the Delrin® step wedge. The two wedges are at orthogonal to one another, so that the backscattered system is tested for its response to organic materials both in front of, and behind, the 10 mm thick steel sheet.

The ANSTO AUS1 system does not carry the proposed ANSI system tests for spatial resolution. A companion test piece (which will also carry the penetration test) is however contemplated by the present invention.

Figure 7A:
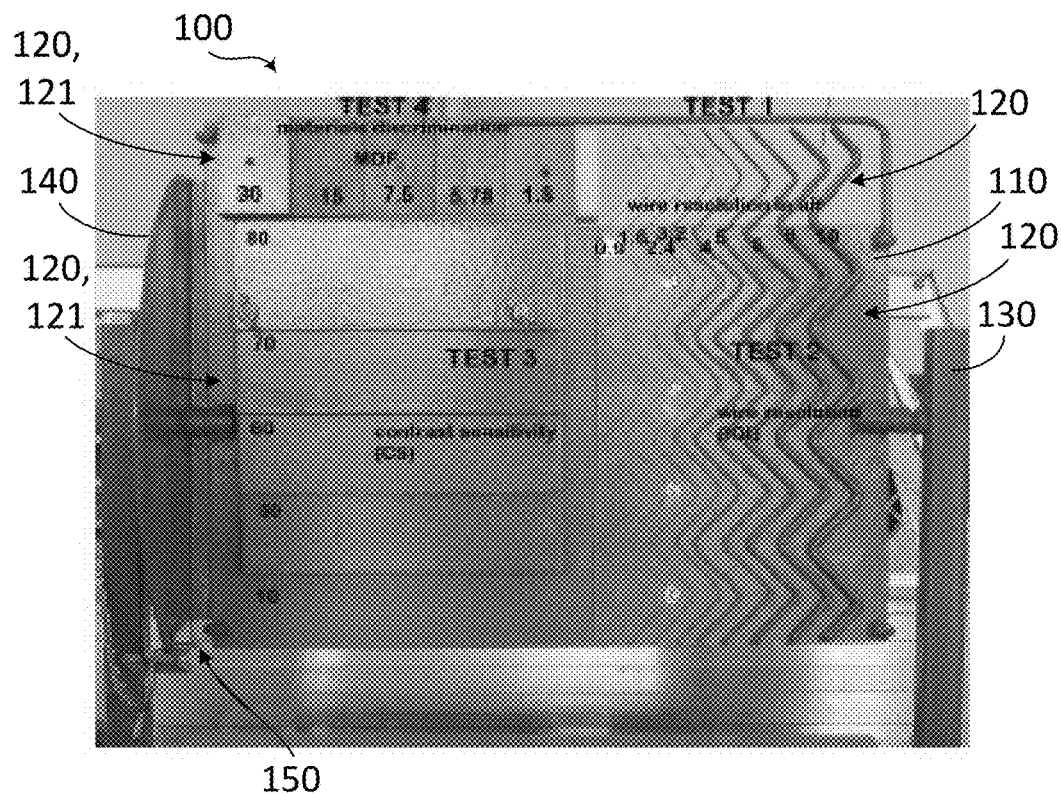
FIG. 7 shows (a) a view of the front of the test object. The numbers shown in this photograph are thicknesses or diameters in mm. (b) a view of the rear of the test object. The numbers shown in this photograph are thicknesses or diameters in mm.
Figure 7B:

Both the proposed ANSI system and the ANSTO system measure wire resolution in air (ANSTO Test 1, FIG. 7b).

Both contain a test for Image Quality Index (FIG. 7b and FIG. 8(c)). For this, the ANSTO AUS1 test is Test 2. The ANSI test requires a series of passes of the test piece through the X-ray system so that the visibility of the wires can be determined as a function of the thickness of the steel plates. This could take as many as ten passes through the system. In contrast the IQI can be determined completely in only one pass of the ANSTO AUS1 test piece through the system.

The ANSI test piece does not contain a test for Contrast Sensitivity. The ANSTO AUS1 test piece does (Test 3).

The types of X-ray examination systems currently supported by the Australia Customs Service are listed in Table 2. The two systems evaluated in this study are shown in bold in the table.

the median beam. Unfortunately manufacturers have not seen fit to provide this information to their users. As a consequence the incorrect guess was made for the horizontal view of the 450 keV system (18°, rather than 23°). This caused some artefacts due to the inclined passage of the X-ray beam through the step wedge to occur. The vertical view for this system is true vertical (90° to the horizontal). In the event the median beam was inclined upwards by 19°.

Once the test piece has passed through the X-ray system the image can then be analysed using the image processing software provided by the manufacturer. Each manufacturer has its own software, and there are significant differences between manufacturers as far as ease of use is concerned.

For the systems tested here the procedure was to enlarge the image (usually ×4). The results of Test 1 were recorded. At this stage information concerning materials discrimination is available as well (Test 4).

Then the contrast tool in the software was slowly varied so as to reveal the wires in the IQI test (Test 2) for successive thicknesses in the step wedge. This gave information on contrast sensitivity and penetration (for systems for which the maximum X-ray energy was less than 450 keV) at the

TABLE 2

X-ray examination systems currently in service at Australian Customs and Border Protection Service Facilities.

|  | CONTAINER | CONTAINER | ULD/Pallet | ULD/Pallet | BAGGAGE | EXPLOSIVES |
|---|---|---|---|---|---|---|
| MANUFACTURER | A | B | C[1] | D | E | F[2] |
| Tunnel size (mm × mm) | 3280 × 4520 | 3500 × 4700 | 2500 × 2500 | 2000 × 2000 | 1000 × 1000 | 1000 × 1000 |
| Energy | 6 MeV | 2.5 MeV | 2.5 MeV | 450 keV (=0.450 MeV) | 140 keV (=0.140 MeV) | 140 keV (=0.140 MeV) |
| Views | Single | Single | Dual | Dual | Single | Multiple (5) |
| Energy Discrimination | Single | Single | Single | Dual | Dual | Dual |
| Penetration[3] (mm steel) | 280 | 180 | 120 | 80 | 30 | 30 |
| Contrast Resolution[4] (%) for steel | 3 | 2 | 2 | NA | NA | NA |
| Wire Resolution (mm) | 2 | 1 | 0.3 | 0.1 | 0.13 | 0.13 |
| IQI[5] (%) | 2 | 3 | NA | NA | NA | NA |
| ASTM Performance[6] (%) | 15 | 20 | 15 | 45 | 55 | 75 |
| Materials Discrimination[7] | Contrast only | Contrast only | Contrast only | Qualitative | Qualitative | Quantitative (≈0.3 kg C4) |

[1]This system is used for pallet search at the Australian Customs and Border Protection Facility in Adelaide, and is a 2.5 MeV system.
[2]This system is integrated a composite system.
[3]Penetration is usually stated in terms of what thickness of steel the X-rays can penetrate. According to convention, contrast resolution is measured by adding blocks of steel to the penetration test piece, and determining when this can just be observed.
[4]Contrast resolution is determined by measuring the amount of steel added to a steel plate required to just observe the added plate. Usually this is the best figure for the range of thicknesses used: the lower the value the better the performance.
[5]IQI is determined by measuring the diameter of a steel wire attached to a steel plate required to just observe the added plate. Usually this is the best figure for the range of thicknesses used: the lower the value the better the performance.
[6]For all the X-ray systems, performance against the ASTM standard suitcase (ASTM F 792-01E2) has been evaluated, and this forms the basis for objective comparison of the performance of the systems.
[7]Quantitative materials discrimination is possible only for multiple view dual energy systems.
Note:
it is up to a user to define what score is considered to be acceptable.

The two systems under evaluation included a 450 keV dual view dual energy and a 6 MeV single energy single view. These are two completely different systems, with different examination roles. Although the test piece is designed primarily for pallet/Aircraft ULD examinations in the range of photon energies from 450 keV to 2.5 MeV, it was considered important to evaluate the ability of the test piece in higher energy machines operating at 6 MeV).

In preparing the test piece for examination it is necessary to know the inclination of the median X-ray beam to the horizontal so that the test object can be set to be normal to same time (Test3). As well, additional information on materials discrimination (Test 4) was acquired.

Subsequent to the tests an evaluation score sheet (FIGS. 26-31) was created.

The performances of the two views were evaluated.

Figure 9A:
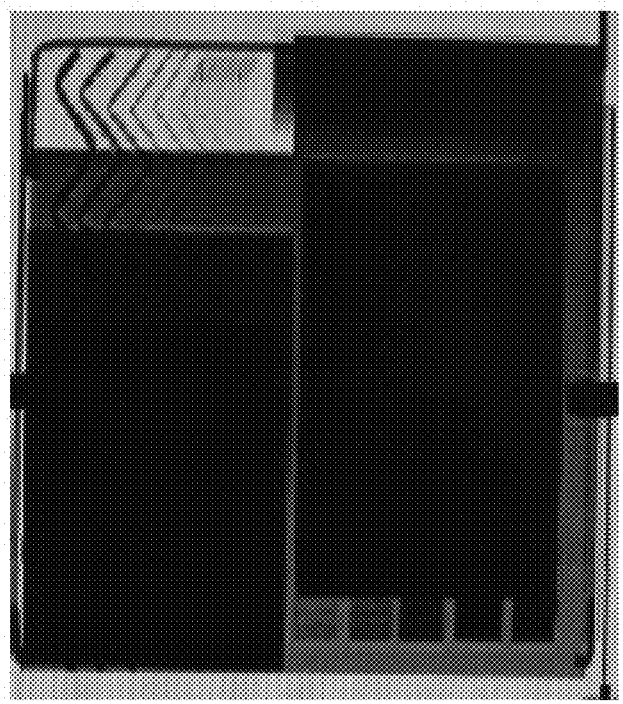
FIG. 9 shows photographs of: (a) the initial image on the monitor screen for the horizontal view of a 450 keV system. The ninth wire (diameter 0.9 mm) can just be seen, as can the organic materials in the Materials Discrimination Test (Test 4); (b) the monitor screen showing the image of FIG. 9(a) using only the software contrast tool; (c) testing for contrast sensitivity and penetration for the horizontal view of a 450 keV system; and (d). the response to Test 4 (Materials Discrimination)

FIG. 9(a) shows the initial image of the test piece. Because no machine recorded images are available this image is a photograph of the monitor screen. Moire pattern artefacts can be seen due to beating between the line rates of the screen and the digital camera. Nevertheless, all the wires in air are visible (the smallest is 0.9 mm), and the materials discrimination software has identified the Delrin® step wedge as organic (the red part at the top centre of the image) and the fact that there are four distinct thicknesses of organic material.

Figure 9B:
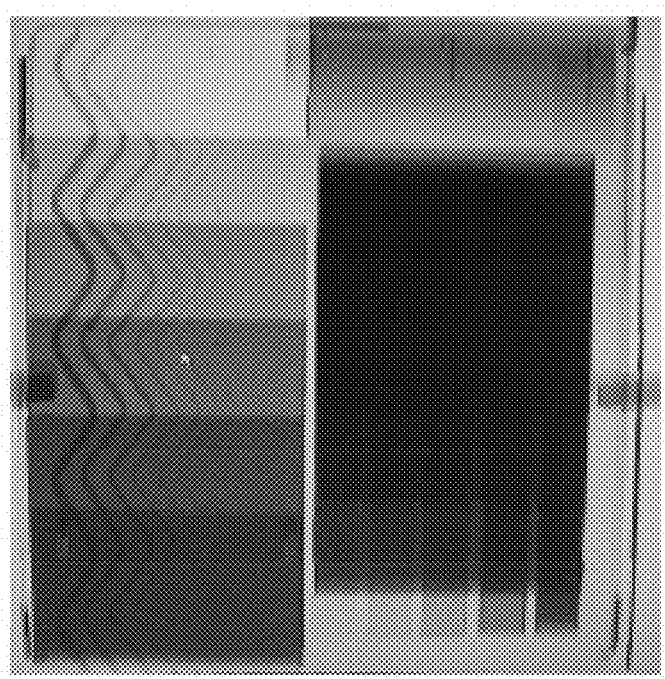

To uncover the wires and plates obscured by the steel step wedges of Tests 2 and 3 the contrast tool of the image processing package was used. A typical improved image is shown in FIG. 9(b).

The change in visibility of the wires as a function of wedge thickness (Test 2 (IQI)) can be clearly seen. For the maximum steel thickness (50 mm) wire 6 can just be seen (3.2 mm). This corresponds to an IQI of 0.064.

Figure 9C:
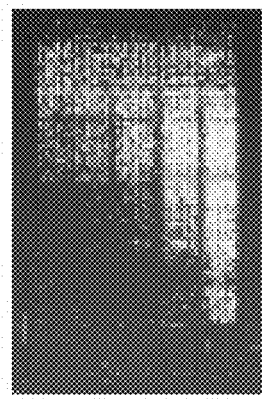

In regard to Test 3, all the plates are visible at the third step (50 mm). This corresponds to a minimum contrast sensitivity of 0.05. Pursuing the contrast adjustment still further the penetration can be tested (FIG. 9(c)). This image shows that the second (5 mm), third (10 mm), fourth (20 mm), and fifth (40 mm) plates can be seen in front of 80 mm of steel.

This indicates that the minimum contrast sensitivity at 80 mm steel is 0.063.

The 450 keV specification is for the recognition of a 100 mm thick lead block behind 90 mm of steel sheets. In this case the system is recognizing 30 mm of steel behind 90 mm of steel plates.

Figure 9D:
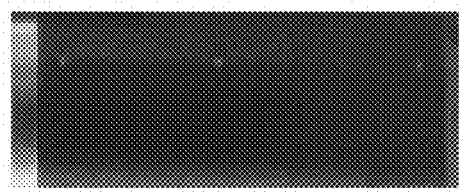

Apart from successfully identifying the Delrin® step wedge as organic, and verifying the number of steps in the wedge (Test 4.1) no further information is forthcoming (FIG. 9(d)).

The score sheet for this test is given in FIGS. 32-37.

Figure 10A:
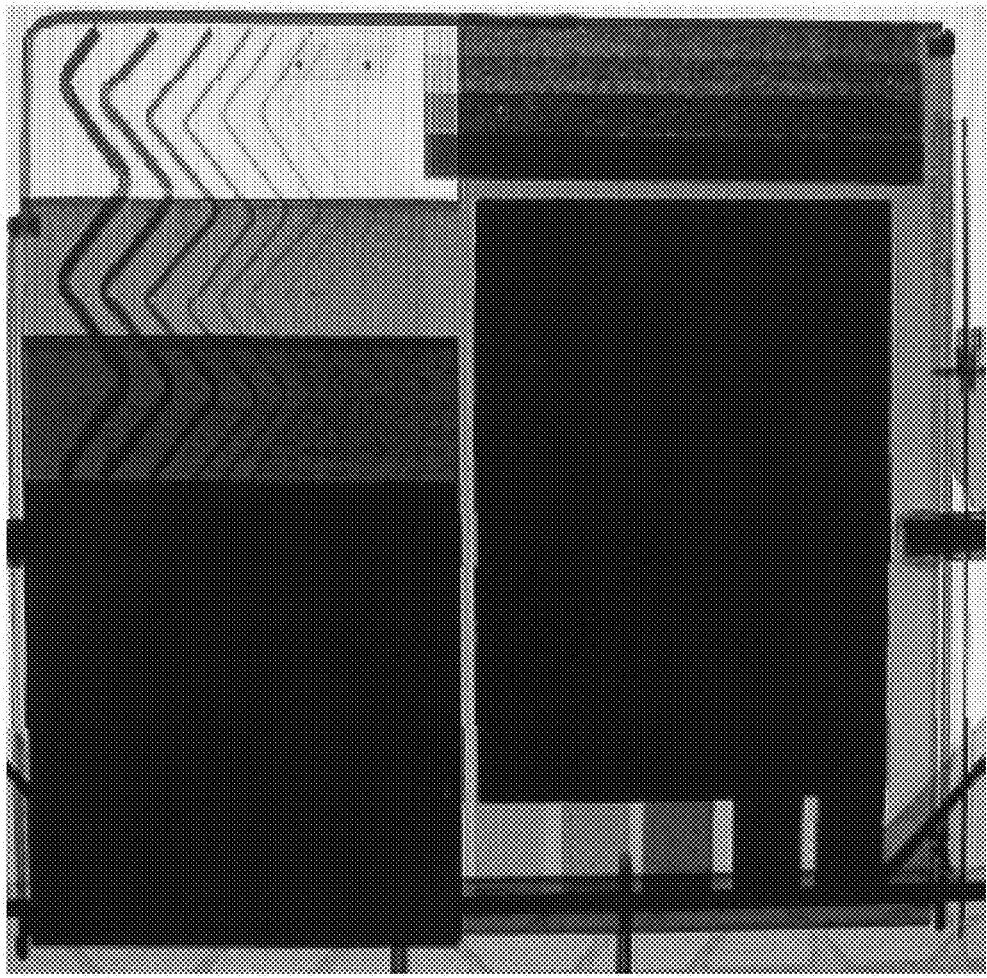
FIG. 10 shows photographs of: (a) the initial image on the monitor screen for the vertical view of the 450 keV system. The ninth wire (diameter 0.9 mm) can just be seen, as can the organic materials in the Materials Discrimination Test (Test 4); (b) the monitor screen showing the image of FIG. 9(a) using only the software contrast tool. Contrast sensitivity and penetration for the vertical view of the 450 keV system can be seen.

FIG. 10(a) shows the initial image of the test piece. Because no machine recorded images are available this image is a photograph of the monitor screen. All the wires in air are visible (the smallest is 0.9 mm), and the materials discrimination software has identified the Delrin® step wedge as organic (the red part at the top centre of the image) and the fact that there are four distinct thicknesses of organic material. As well, the image of the Delrin® step wedge can be seen.

Figure 10B:
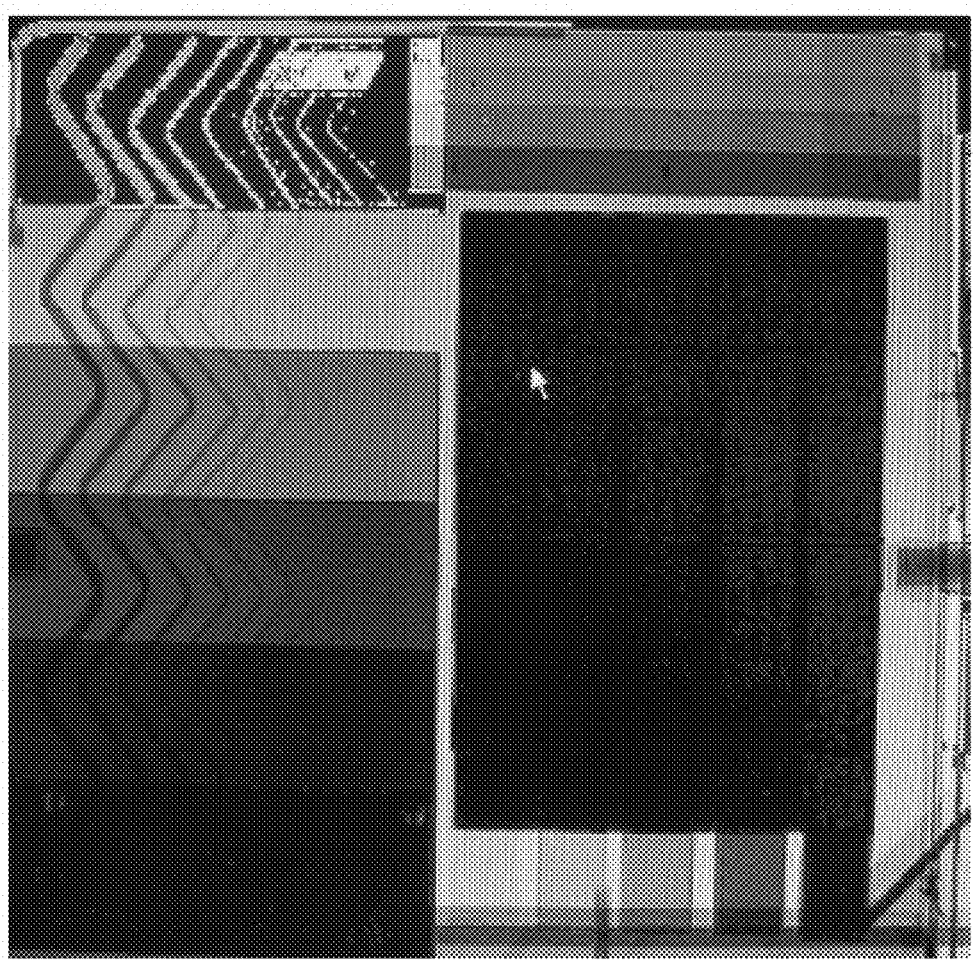

To uncover the wires and plates obscured by the steel step wedges of Tests 2 and 3 the contrast tool of the image processing package was used. A typical improved image is shown in FIG. 10(b).

The change in visibility of the wires as a function of wedge thickness (Test 2 (IQI)) can be clearly seen. In regard to Test 2, all the seven wires are visible at the third step (40 mm). This corresponds to a minimum IQI of 0.06.

For Test 3, behind the maximum steel thickness (80 mm) all five plates can be seen. The 2.5 mm plate is barely visible (2.5 mm). This corresponds to a CS of 0.03 for 80 mm steel.

The 450 keV specification is for the recognition of a 100 mm thick lead block behind 90 mm of steel sheets. In this case the system is recognizing 30 mm of steel behind 90 mm of steel plates.

Apart from successfully identifying the Delrin® step wedge as organic, and verifying the number of steps in the wedge (Test 4.1) the image also show the existence of the Delrin® step wedge (FIG. 10(a)). Some evidence is apparent of an object behind the Delrin® step wedge, and in fact, three steps of the MDF wedge can be seen (Test 4.2).

The score sheet for this test is given in FIGS. 38-43.

Figure 11A:
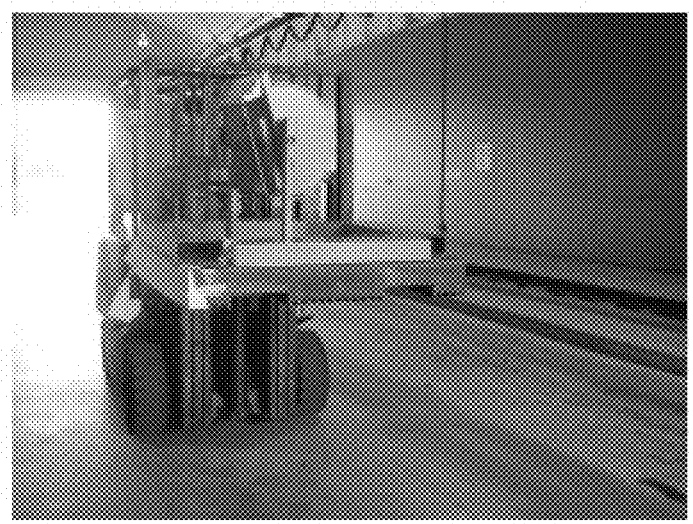
FIG. 11 shows photographs of: (a) the test piece set in position in the examination tunnel of the 6 MeV X-ray examination system; (b) the initial image on the monitor screen for the horizontal view of an X-ray system. Typically five wires can be seen for all the step wedge thicknesses; (c) a monitor image in which all the steel plates can be seen.

The test piece was set in position in the examination tunnel of the 6 MeV X-ray examination system (6 MeV, single horizontal view) as shown in FIG. 11(a). In this system the source and detector systems move, and the object under examination remains stationary. The angle of the test piece was set to 18° to the horizontal so that the face of the test piece can be as close as possible to orthogonal to the median beam of the X-ray fan. It should be noted that the test piece may be moved vertically so that all the detectors of interest may be tested, the source "sweet spot" may be tested or found.

Figures 11B, 11C:
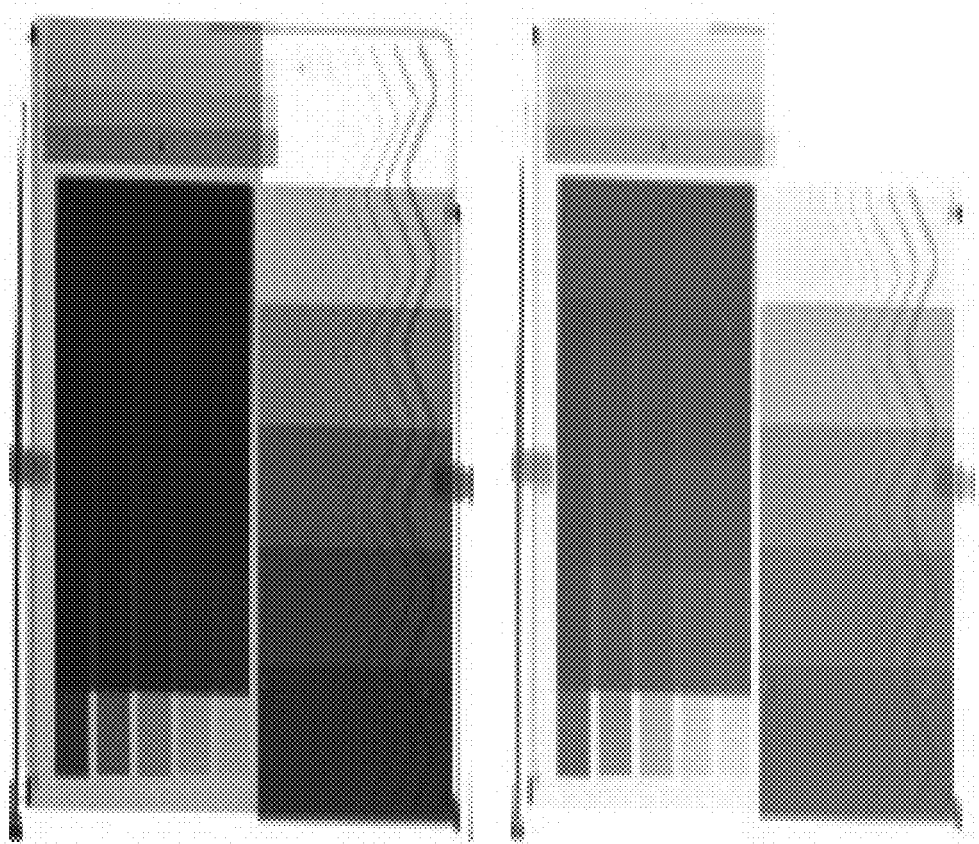

FIG. 11(b) shows the initial image of the test piece. This image is the actual image recorded by the X-ray system: the images were photographs of the monitor screen. Only four of the wires in air (Test 1) are visible (diameter 5 mm). There is no materials discrimination software capability, but the system has the fact that the object is a step wedge, of lower attenuating power that steel step wedge, and possibly is organic. As well, the image of the Delrin® step wedge can be seen.

Simply altering the brightness cursor gives FIG. 11(c). In this image the wires can be seen behind the step wedge (Test 2, IQI). The sixth wire (diameter 4 mm) can be seen behind a 20 mm thickness of steel. The fifth wire (diameter 5 mm) can just be seen behind a thickness of 50 mm. The minimum IQI for a wedge thickness of 50 mm is 0.10.

For Test 3, behind the maximum steel thickness (80 mm) all five plates can be seen with clarity. The system is not near its penetration limit (280 mm of steel).

The 6 MeV system specification is for the recognition of a 100 mm thick steel bar behind 280 mm of steel sheets. In this case the system has no trouble recognizing 30 mm of steel behind 90 mm of steel plates.

Because this system does not have materials discrimination capability it cannot successfully identify the Delrin® step wedge as organic but it does identify the number of steps in the wedge (Test 4.1). The image also show the existence of the Delrin® step wedge (FIG. 9(b)). Some evidence is apparent of an object behind the Delrin® step wedge, and in fact, three steps of the MDF wedge can be seen (Test 4.2)

The score sheet for this test is given in FIGS. 44-49.

The test piece was not designed to test photon energies greater than 2.5 MeV. The comparatively poor performance on Tests 1 and 2 is related to the small scattering crosssection (or linear absorption coefficient) of the steel at 6 MeV.

Figure 12:
FIG. 12 shows an example of an X-ray tunnel in which a test piece of about 1250 mm×1250 mm according to the invention may be used.
Figure 13:
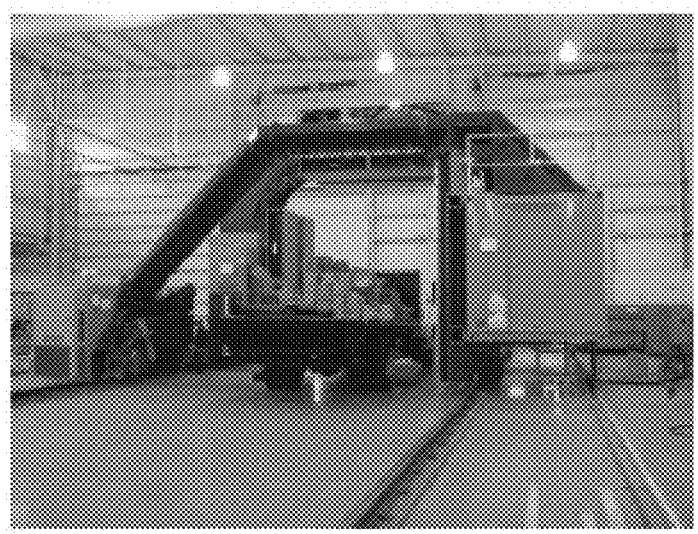
FIG. 13 shows an example of an X-ray tunnel in which a larger test piece according to the invention may be used. This X-ray tunnel is suitable for scanning shipping containers.

FIGS. 12 and 13 show suitable X-ray tunnels in which various the test pieces of the present invention may be used. A test piece such as AUS1 and/or AUS2, having dimensions about 1250×1250 mm, is suitable for use in the tunnel of FIG. 12, whereas a larger test piece, such as AUS4, is suitable for use in the tunnel of FIG. 13. The X-rays used in the tunnel are commonly generated by a linear accelerator (LINAC). However AUS4 may also be used for testing of other systems, for example gamma-ray based systems as well as any system which generates gamma or X-rays of comparable energies. The tunnel has a detector array on the opposite side of the tunnel to the X-ray source for detecting X-rays which have passed through the tunnel, and optionally through the item to be tested (for example the test device of the invention). In some cases the source will provide X-rays of a single energy. In other cases the source may be capable of switching between different energies. It may be capable of switching on a regular basis. Such switching enables determination of density and/or at least partial identification of materials in the X-ray beam.

Figure 14:
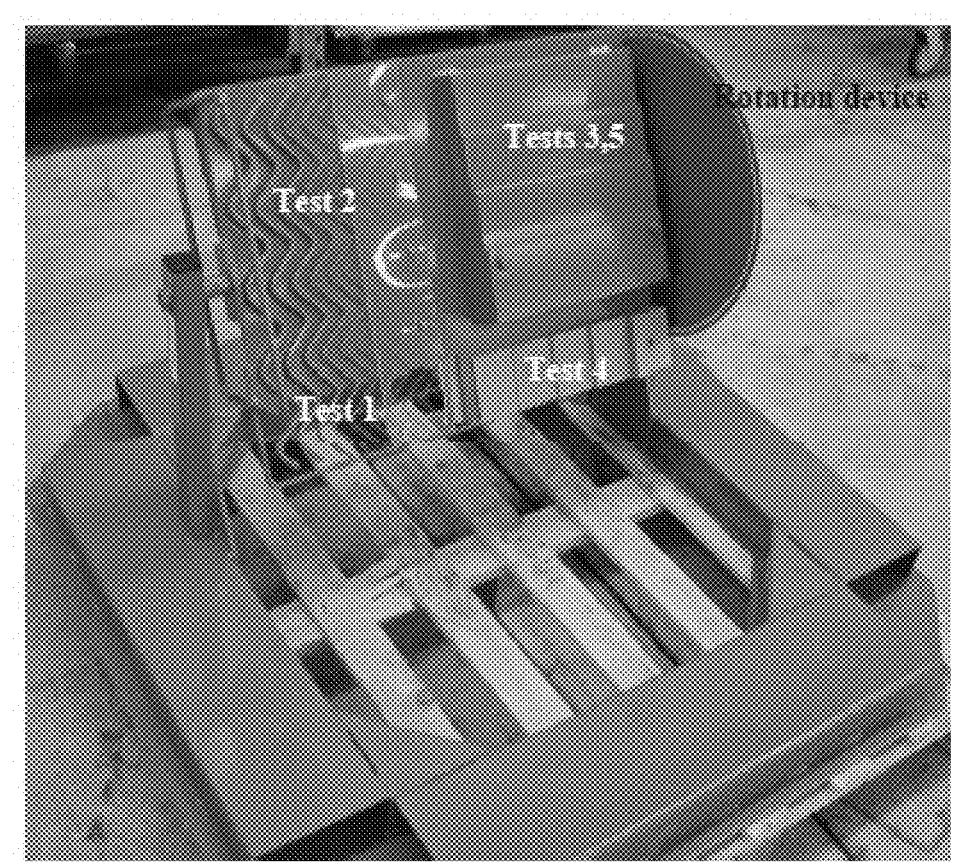
FIGS. 14 and 15 show photographs of AUS1 and AUS2 test pieces.

FIG. 14 shows a photograph of AUS1, a test piece according to the invention. Tests in AUS1 are:
TEST1: wire resolution in air
TEST 2: IMAGE QUALITY INDEX (IQI): wires to be detected behind step wedge
TEST 3: CONTRAST SENSITIVITY (CS): plates to be detected behind step wedge TEST 4: MATERIALS DISCRIMINATION: identification of organic material in air TEST 5: Penetration tests for <450 keV.

Plates may be added to change the step thicknesses if required. TEST 4 may also be used as a backscatter test. Angle adjustment in AUS1 is in increments of 2 degrees.

Figure 15:
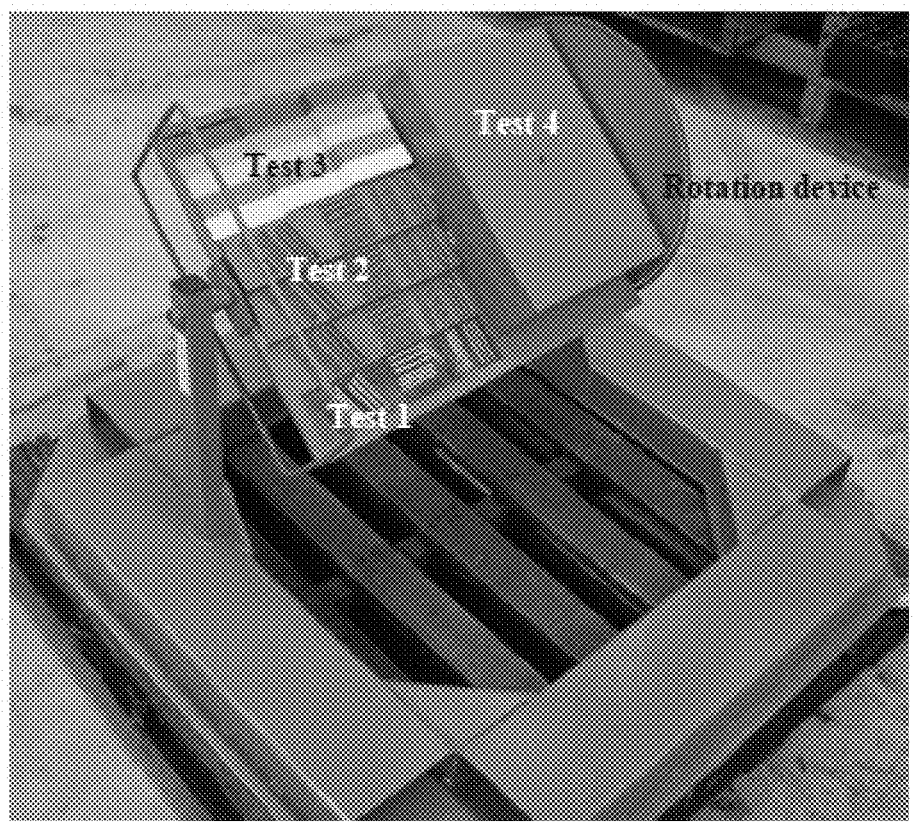

FIG. 15 shows a photograph of AUS2, another test piece according to the invention. Tests in AUS2 are:

TEST 1: RESOLUTION of wire bundles in air.

TEST 2: RESOLUTION of wire bundles behind a steel step wedge with steps of 10, 20, 30 mm.

TEST 3: PENETRATION through steel—50 mm of steel in the shape of a kite behind 160 mm of steel. AUS2 may have up to 300 mm of steel in front of the kite. The thickness of steel may be between about 100 mm and about 300 mm, in increments of 25 mm (see FIG. 15a).

TEST 4: DISCRIMINATION BETWEEN PLASTIC OBJECTS. Five plastics with different effective electron densities are made in the form of a step wedge with steps of 10, 20, 40 mm. There may be more than five plastics, or they may be wedged overlapping combination of two or more.

Figure 15A:
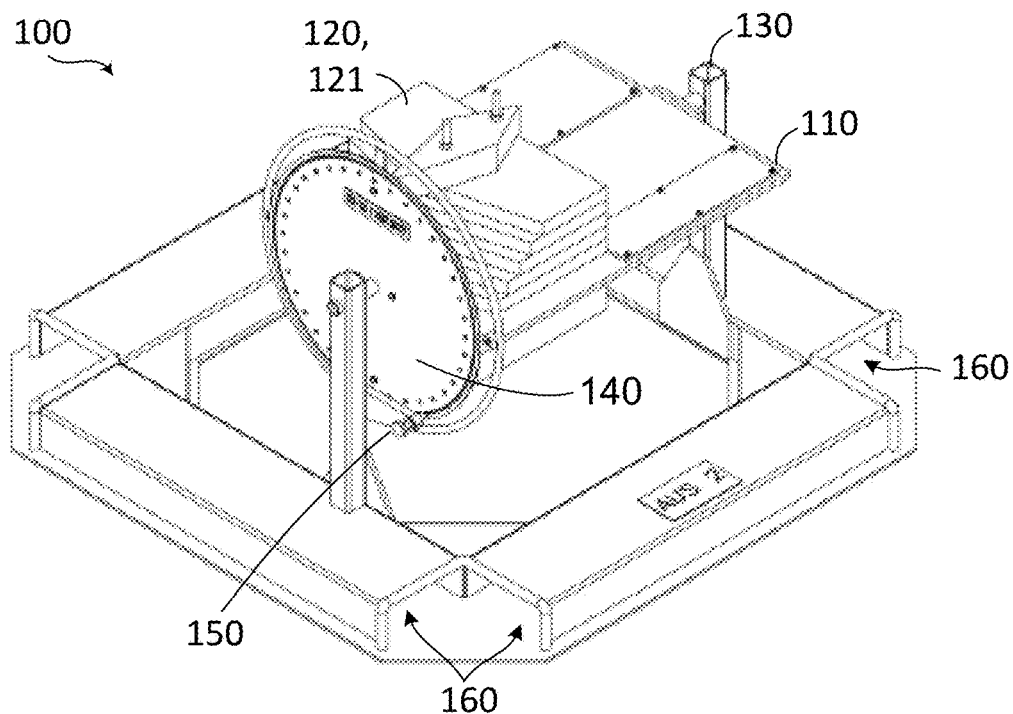
FIG. 15a shows a diagram of AUS2, showing 235 mm stack of plates below the test kite—this may be taken up to 300 mm.

In FIG. 14 and FIG. 15 the holes in the support for accepting tines of a forklift are clearly visible. There are in each case orthogonal pairs of holes so that a forklift may approach the test piece from front, either side or back in order to fit the tines into the holes. FIG. 15a shows a diagram of AUS2 showing 235 mm stack of plates below the test kite. This may be taken up to 300 mm. In FIGS. 7A and 15A, the device 100, the support 110, the at least one test module 120, including at least one test module having a step wedge 121, the stand 130, the rotatable holder 140, the latching mechanism 150 and the insertion region 160 are shown.

Figure 16:
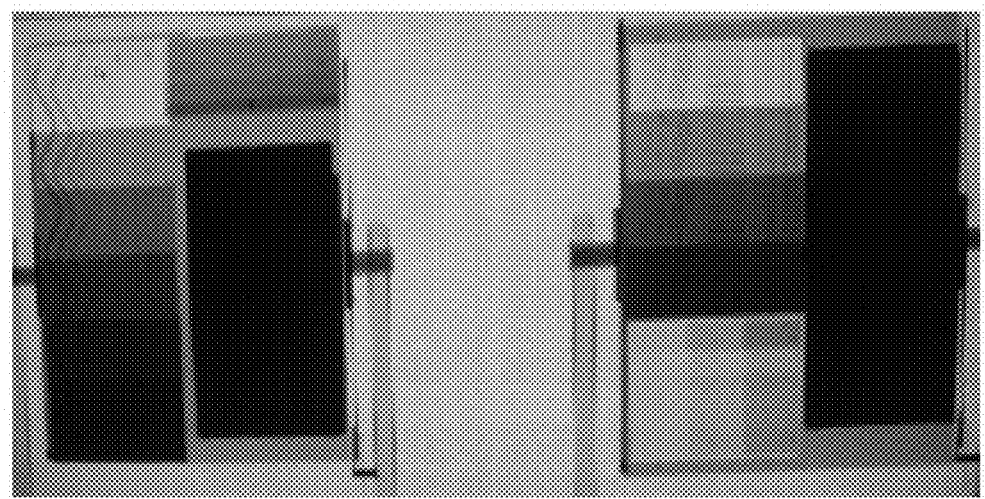
FIGS. 16 and 17 show images of AUS1 and AUS2 taken in an X-ray tunnel
Figure 17:
Figure 18:
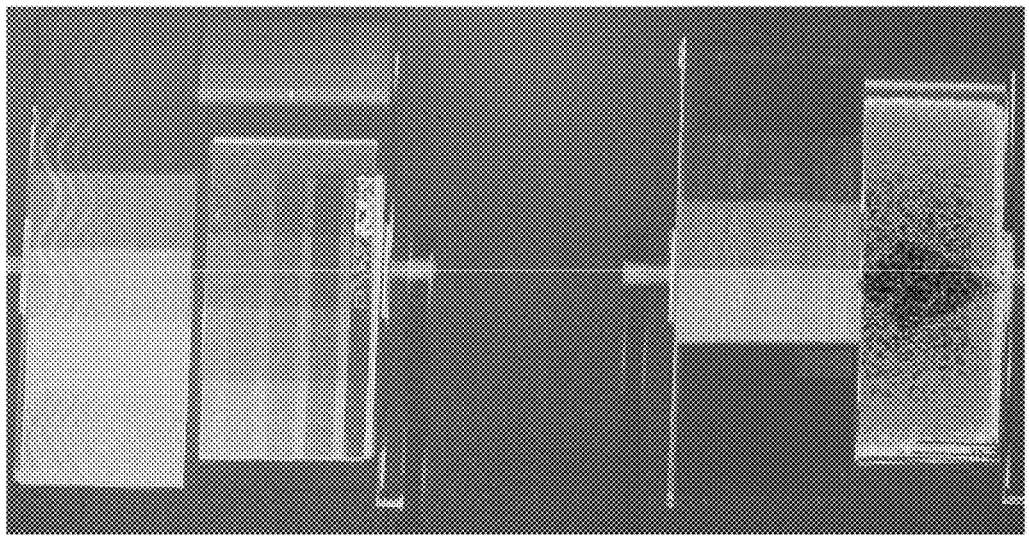
FIG. 18 shows another adjusted image of AUS1 and AUS2 using the same raw image as in FIG. 16 but different image processing tools.

FIG. 16 shows a raw image of AUS1 and AUS2 taken in an X-ray tunnel of 6 MeV (single energy, single view with nominal penetration of 280 mm steel: tunnel size 3.3 m by 4.5 m) showing the raw data from which assessment of the tunnel is derived. FIGS. 17 and 18 shows the same image following adjustment using suitable software in order to enhance particular features. It should be noted that in reality FIGS. 17 and 18 are in colour (not visible in the figures of this specification) which would further highlight features of the image. This illustrate the utility of software tools for enhancing a raw image so as to better visualise features of the image. These tools are required and should be provided by the manufacturer. Although not a primary function of the test standards, it is clear that they may also be used to evaluate the capability of viewing software provided.

Figure 19:
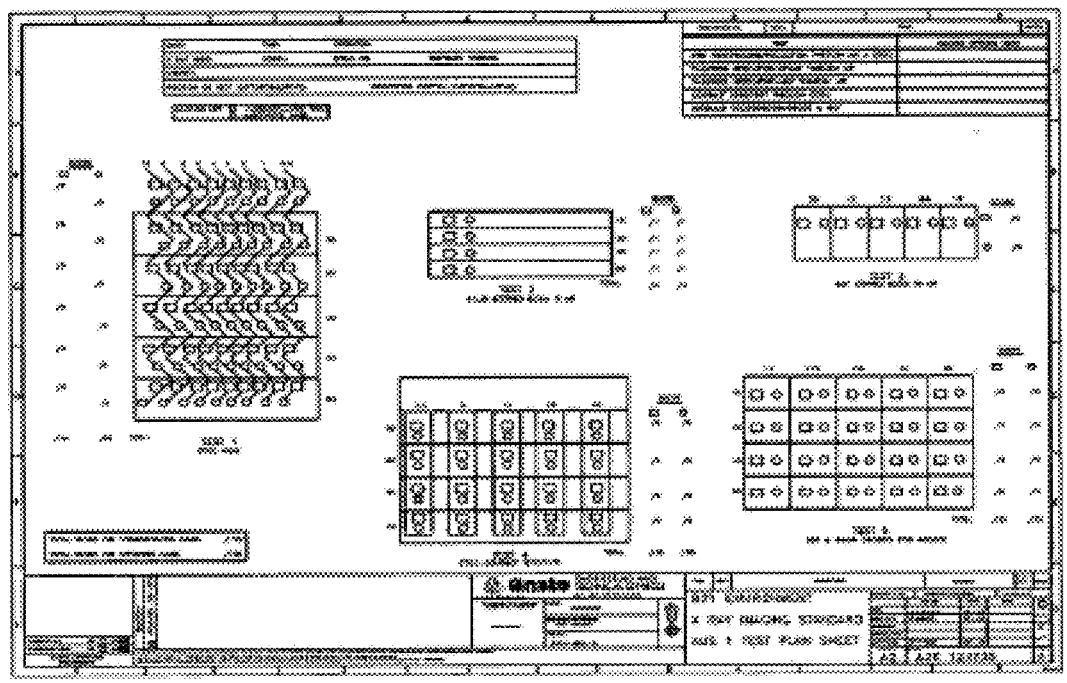
FIG. 19 shows two scoring sheets suitable for determining a test score for AUS1 and AUS2 respectively.
Figure 19:
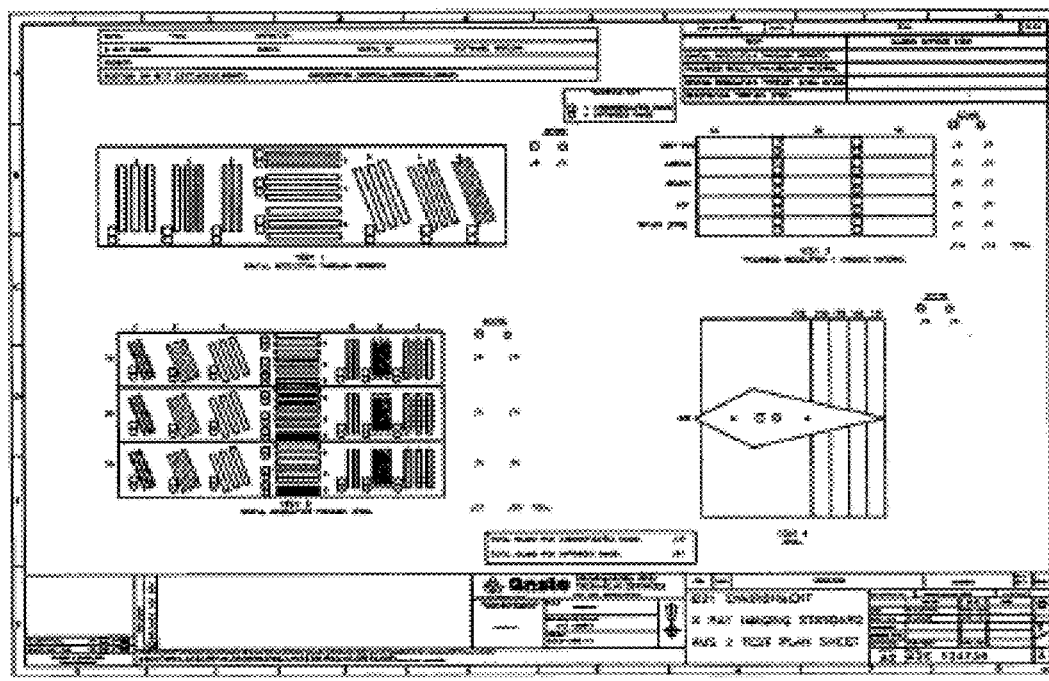

FIG. 19 shows two scoring sheets suitable for determining a test score for AUS1 and AUS2 respectively.

Summary of Testing

The tests were made for the horizontal and vertical views of the 450 keV system, dual view, dual energy X-ray pallet examination system and the 6 MeV, single view container examination system.

In all cases:
a complete data set for wire resolution in air, Image Quality Index, Contrast Sensitivity, and materials discrimination can be acquired with only one pass of the ANSTO AUS1 test piece through the X-ray system;
a numerical score can be generated which indicates the overall performance of the system under test.

Penetration can be measured for those systems which operate at less than 450 keV. The systems in the inventory of the Australian Customs Service for which this is applicable can be seen by reference to Table 2.

The comparative performance of the systems is shown in Table 3.

TABLE 3

Comparative overall performance of the systems tested

| MANUFACTURER | SYSTEM | VIEW | SCORE/110 |
|---|---|---|---|
| D | 450 keV | HORIZONTAL | 72 |
|   | 450 keV | VERTICAL | 80 |
| A | 6 MeV | HORIZONTAL | 72 |

The performance of the 450 keV vertical view is superior to the other systems tested. Although the 6 MeV system has scored the same as the 450 keV horizontal view it has achieved this without the benefit of materials discrimination capability.

As well, comparisons of performance between individual tests can be readily undertaken.

CONCLUSIONS

The ANSTO AUS1 Test Piece can be used successfully for the comparative testing of X-ray examination systems. In its present form it is suited for the testing of systems with X-ray energies in the range 160 keV to 2.5 MeV, and tunnel sizes in the range 1300 mm×1300 mm to 2500 mm×2500 mm, i.e. the testing of pallet search systems and small container search systems.

It is capable of testing:
wire resolution in air
Image Quality Index
Contrast Sensitivity
Penetration (for systems less than 450 keV)
Materials Discrimination.

It may be used for the testing systems with back scatter detectors.

An additional unit of similar size to the ANSTO AUS1 Test Piece AUS2 was constructed to enable penetration and wire bundle resolution for all the classes of pallet and container X-ray examination systems.

Tests were made using Dual View Pallet Search System (which operates at 450 keV) and the Single View Container Search System (which operates at 6 MeV). The test piece was designed so as to test as many aspects of X-ray system performance as possible in one pass of the test piece through the X-ray system, consistent with the requirement that the test piece could be carried on a standard pallet (1200 mm×1200 mm) and pass through an examination portal of 1300 mm×1300 mm.

The test piece contained tests for:
single wire resolution in air,
wire resolution behind steel plates (Image Quality Index (IQI)),
contrast sensitivity (CS), and
materials discrimination. It could, as well, test for penetration for the 450 keV system.

A separate test piece (AUS 2) has been designed to enable the testing of wire bundle resolution behind various thicknesses of steel, penetration for systems operating above 450 keV and materials discrimination for a wide range of organic materials, with and without screening by steel.

The test piece performed as designed, and the required comprehensive data on system performance was acquired in just one pass per view of the test piece through the X-ray examination systems. A scheme for recording the data from these tests, similar in nature to that for cabinet systems (tunnel sizes less than 100 mm×100 mm) using the ASTM F 792-01E2 test suitcase, has been devised.

Advantages of the test device of the present invention include:
- it may be capable of conducting a complete set of radiography tests as described by, for example, ASTM small case standard: being based on a recognized standard there are no concerns regarding validity of tests;
- high rate with which tests can be performed due to a rotating angle selector, wedge construction and forklift construction;
- ability to apply recognised standards across a large range of entries (demonstrated 180 keV to 6 MeV) with equal ease, again due to rotating test plates and wedge construction, and
- forklift ready construction to make the test device easy to transport and use.

A further test piece, AUS4, was built and designed specifically for screening shipping containers. Its size, configuration and intention were designed for this purpose. AUS1 and AUS2 (described above) were designed for a medium size tunnel, i.e. about 1000-1300 mm in width and height. They may be used in larger systems, for example X-ray tunnels suitable for scanning shipping containers, with a few inconveniences. Thus the smaller size of test pieces AUS1 and AUS2 would require them to be elevated incrementally in order to cover the whole array of detectors, or a substantial portion thereof. Also physically these test pieces are somewhat smaller and are therefore more difficult to assess. AUS4 consists of two major module designs in addition to optionally including one or more radioactive sources.

The design of AUS4 was a product of two problems with scaling test pieces:
a. sheer size and amount of steel involved prohibits use of a single system, consequently AUS4 comprises at least three separately transportable modules.
b. the fact that the scanner system has two major functions in imaging cargo:
- spectroscopic component using dual energy for material discrimination, and
- non-spectroscopic (energy and intensity) component used for penetration and resolution.

Dual Energy Capability

In these test, the source alternates between at least two separate energy levels (e.g. between 3 and 6 MeV). By comparing detected signals from these two energy levels, data concerning the nature of the intervening materials may be obtained. This comparison, and derivation of the data, may be accomplished by means of a computer or other data processing device coupled to a detector or detector array of the X-ray tunnel. Such data includes density and effective atomic number, commonly known as Zeff (an indicator of the nature of the intervening material). Density and average atomic composition (Zeff) may be tested using plastic overlapping wedges. In these wedges at least two separate thicknesses of plastic are provided, so as to allow data to be obtained for penetration through those different thicknesses. These allow Zeff to be evaluated in increments of Zeff from about 6 to about 13. This operation does not require the examination of many detectors to measure—it is only necessary to provide a large meaningful image. Large numbers of detectors, commonly used to achieve a high resolution image of the whole container and its contents, are not needed. The overall number of detectors is of course fixed by the X-ray tunnel used (in particular by the detector array of the tunnel), however the number of detectors used relates to the number of detectors located such that the relevant portion of the test piece intervenes between the X-ray source and the detectors, and therefore relates to the size, design and/or orientation of the test piece. As described above change in the LINAC (linear accelerator X-ray source) energy, from for example 4 MeV to 6 MeV, changes the spectrum and affects the dual energy response of the system.

Single Energy Capability

Penetration is a measurement obtained from the higher energy portion of X-ray spectrum. The X-ray source (tube or LINAC) produces a spectrum by a Bremsstrahlung process, with the shortest frequency (highest or maximum energy) being equal to the acceleration voltage. Thus, for example 2 MeV is produced by 2 MV accelerating voltage. An adequate number of detectors should be used to get a good measurement, that is, the penetration module in use intervenes between the detector array and the X-ray source such that the X-rays from the source which pass through the module impact on the adequate number of detectors (i.e. the penetration module is of sufficient size, design and/or orientation to achieve this). A critical parameter is the provision of a large, clear image of a steel object behind 300 mm of steel (maximum). This is achieved by providing a wedge which is diagonally arranged, so as to:
a. minimise image compression effects.
b. measure the image aspect ratio (which may also be measured by counting step artefacts in the image (if required) to measure data gathering frequency).

The resolution module in AUS4 may be a composite of AUS1 and 2 resolution modules, described above and shown in FIGS. 14 and 15. It may be arranged in several (e.g. 3, 4, 5, 6, 7 or 8) segments to allow for fan beam curvature and detector geometry arrangement. All the detectors of the X-ray system, or as many thereof as practically possible, should preferably be tested to ensure uniform performance of the system, so the test piece is arced. Each segment may be independently rotatable (and lockable into a desired orientation). They may be rotatable so as to achieve image projection onto all detectors, or so as to maximise the number of detectors tested.

Radioactive Source

AUS4 may also comprise one or more radioactive sources. The source(s) may comprise Cs-137 or some other radioisotope (for example as listed in the American National Standard, ANSI N42.35-2006 intended for evaluation and performance monitoring of radiation detection portals). It (they) may comprise K-40 (for example in the form of naturally occurring KCl). It (they) may comprise some other radioactive isotope. Advantages of K-40 are that it is less expensive than Cs-137 or other radionuclides listed in the ANSI N42.35-2006 and is not regulated in Australia by ARPANSA (Australian Radiation Protection and Nuclear Safety Agency), and therefore does not require a licence for use. Inclusion of a radiation source renders the test device useful for testing a radiation portal as well as for testing an X-ray tunnel. The radioactive source may be located in one or more (e.g. 2, 3, 4 or 5) spot sources, commonly on a wall (preferably inside wall) of the container. These spot sources may be located along a vertical line. They may be spaced equidistantly. There may for example be 3 spot sources, one at the top of the container, one midway up the container and one at the bottom of the container. This arrangement may be used with all radioactive sources, including Cs-137. An alternative arrangement is a column of the radioactive source, also commonly on a wall of the container. This may be convenient for K-40, which is less expensive and is freely available. Thus a tall thin vertical vessel may be disposed on a wall of the container and the vessel filled with the radioactive source to form the column.

Container

The test modules of AUS4 may be located, or may be locatable, in a shipping container, optionally modified. The container may be the same size as a standard shipping container, e.g. a standard 20 foot (6 m) shipping container. It may be about 2.4 m high. It may be about 2.4 m wide. It may be about 6 m long. The modification to the container comprise replacement of some portions of the metal walls of the container by a material that is more transparent to X-rays, e.g. plastic. A suitable plastic is for example polycarbonate. Sufficient of the walls may be plastic that resolution and material discrimination modules will be viewed though plastic walls. The penetration module may also be viewed through a plastic wall, although this is not essential, since a thin metal wall would not substantially affect the penetration test (as the actual test piece is commonly over 100 mm thick, whereas the wall is commonly only a few millimeters, e.g. about 2 to 5 mm thick. Shipping containers come in two common sizes, 20 and 40 foot. They may be standard one door, opentop, flatrack, reefer, highcube or platform (these are described for example at http://en.wikipedia.rg/wiki/Intermodal_freight_shipping_container, the contents of which are incorporated herein by crossreference).

In order to be suitable for use in an X-ray tunnel capable of scanning a standard shipping container, the test modules should preferably be capable of fitting inside a standard shipping container. They may have a maximum height of less than about 2.3 m, or about 2.2, 2.1, 2.0, 1.9, 1.8, 1.7, 1.6 or 1.5 m, or of about 1.5 to about 2.3 m, or about 1.5 to 2, 2 to 2.3 or 1.8 to 2.2 m, e.g. about 1.5, 1.6, 1.7, 1.8, 1.9, 2, 2.1, 2.2 or 2.3 m. They may have a maximum width of less than about 2.3 m, or about 2.2, 2.1, 2.0, 1.9, 1.8, 1.7, 1.6 or 1.5 m, or of about 1.5 to about 2.3 m, or about 1.5 to 2, 2 to 2.3 or 1.8 to 2.2 m, e.g. about 1.5, 1.6, 1.7, 1.8, 1.9, 2, 2.1, 2.2 or 2.3 m. They may in combination have a maximum length of about 1 to about 6 m, or about 1 to 3, 3 to 6 or 2 to 5 m, e.g. about 1, 1.5, 2, 2.5, 3, 3.5, 4, 4.5 or 5 m. The test modules, or the test device, should be capable of fitting through a maritime container tunnel. These are typically about 3.3 m (wide) by about 4.6 m (high). Thus the test module, or test device, should have a maximum width of less than or equal to about 3.2 m, or about 3, 2.8, 2.6 or 2.4 m. It should have a maximum height of less than or equal to about 4.5 m, or about 4, 3.5 or 3 m. Each dimension should be sufficiently large that a usable image may be obtained in suitable X-ray tunnels. Thus the minimum dimension (height, width, independently) may be about 2, 2.5 or 3 m.

The container may have regions for training and scenario testing. There may be a training/scenario testing region on either side of the other modules (materials discrimination, penetration, resolution etc.). This may house modules for training operators to recognise banned items when viewing a scan of the container. Suitable modules may for example contain contraband, guns or other weapons. In some embodiments, the container is supplied with a standard test/scenario module, containing items which are generally banned. A separate discretionary test/scenario module may be supplied which may be filled or partially filled by a user with site specific banned items. Thus in a particular country, items may be banned which are allowed in other countries. These items may be loaded into the discretionary test/scenario module.

Figure 20:
FIG. 20 shows a suitable container which may be used either in conjunction with, or as a component of, a test device for a container sized X-ray system.
Figure 21:
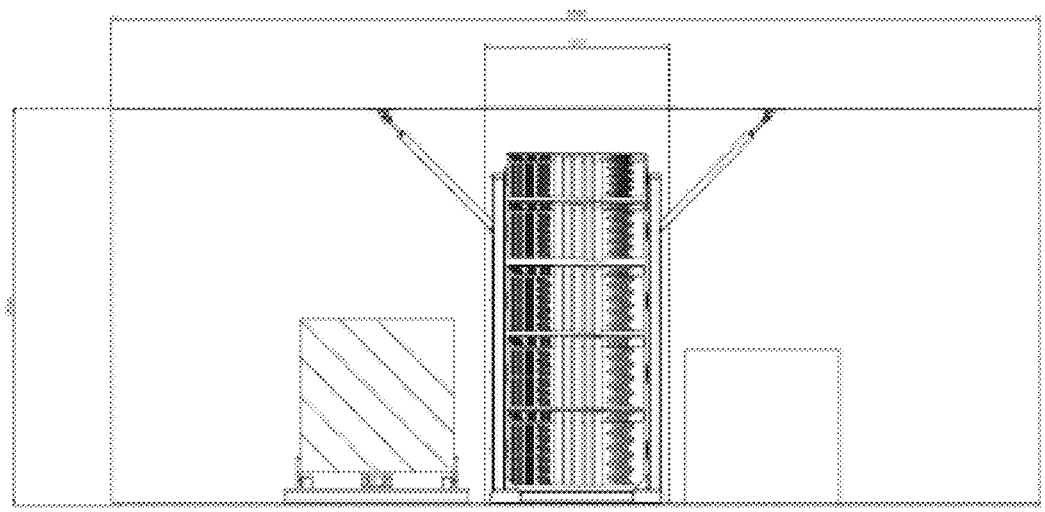
FIGS. 21 and 22 show different diagrammatic views of the container, illustrating the location of test modules therein.
Figure 22:
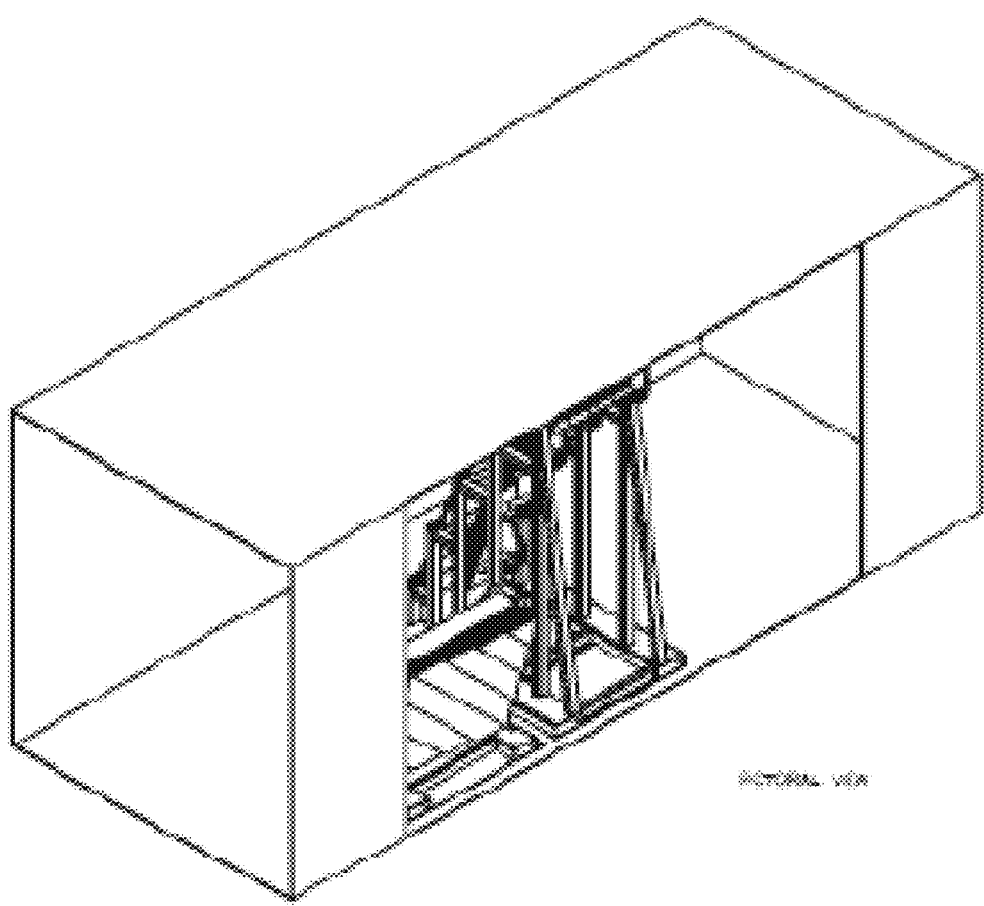
Figure 23:
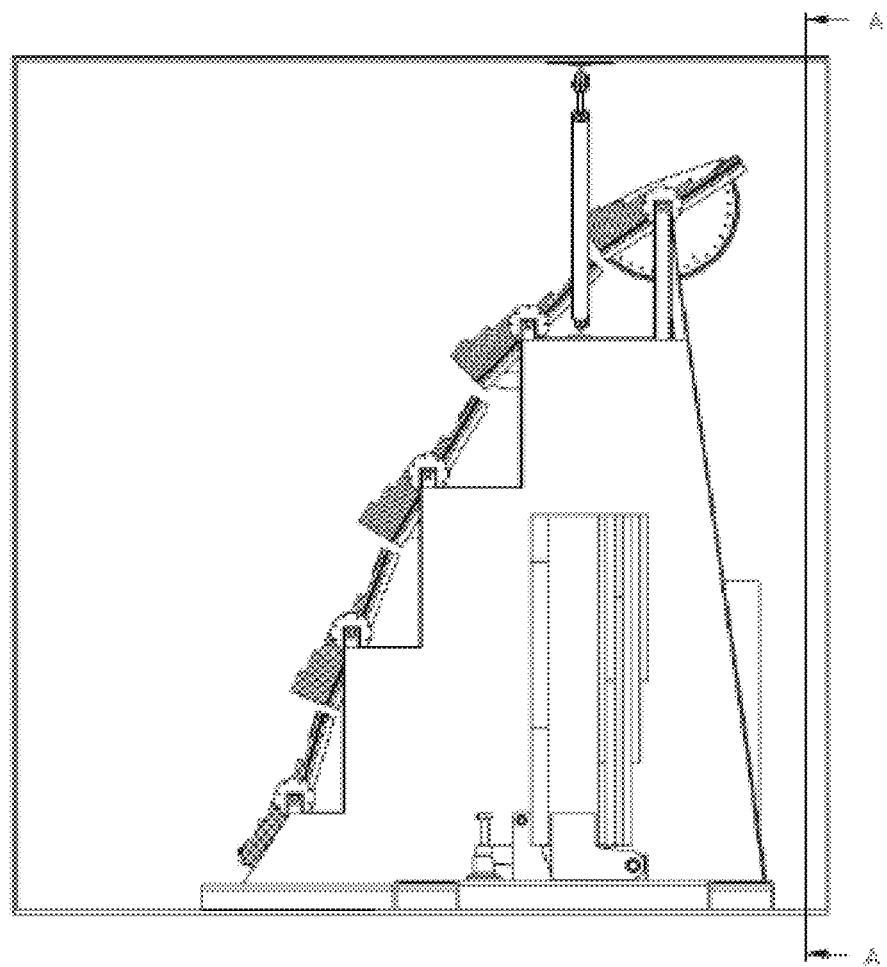
FIG. 23 shows a cross-section of the container, showing the location and design of the penetration module which may be used in this embodiment.
Figure 24:
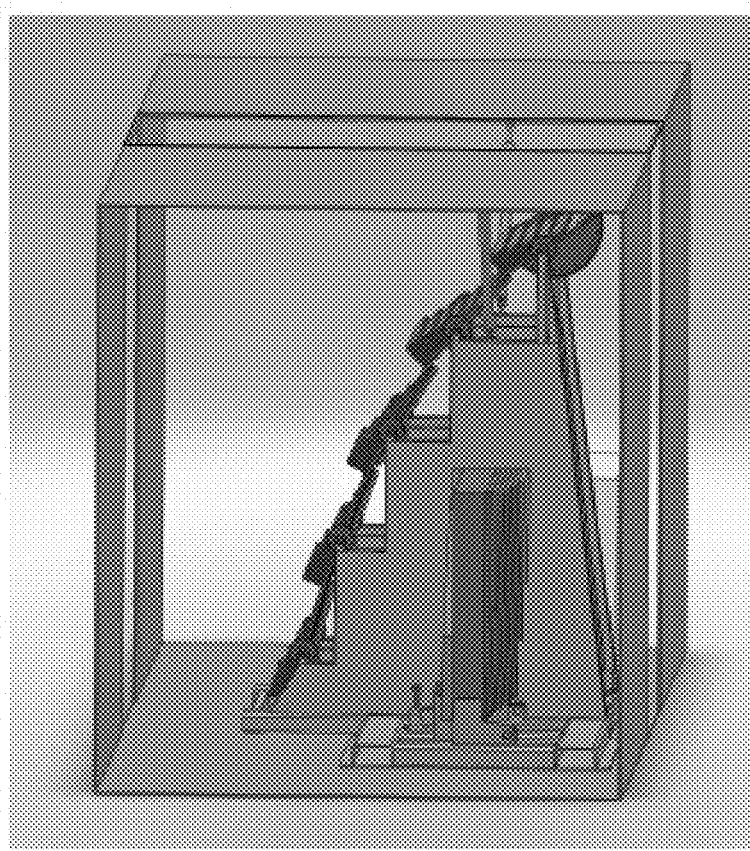
FIGS. 24 and 25 show further details of the penetration, resolution and material discrimination modules of the test device.
Figure 25:
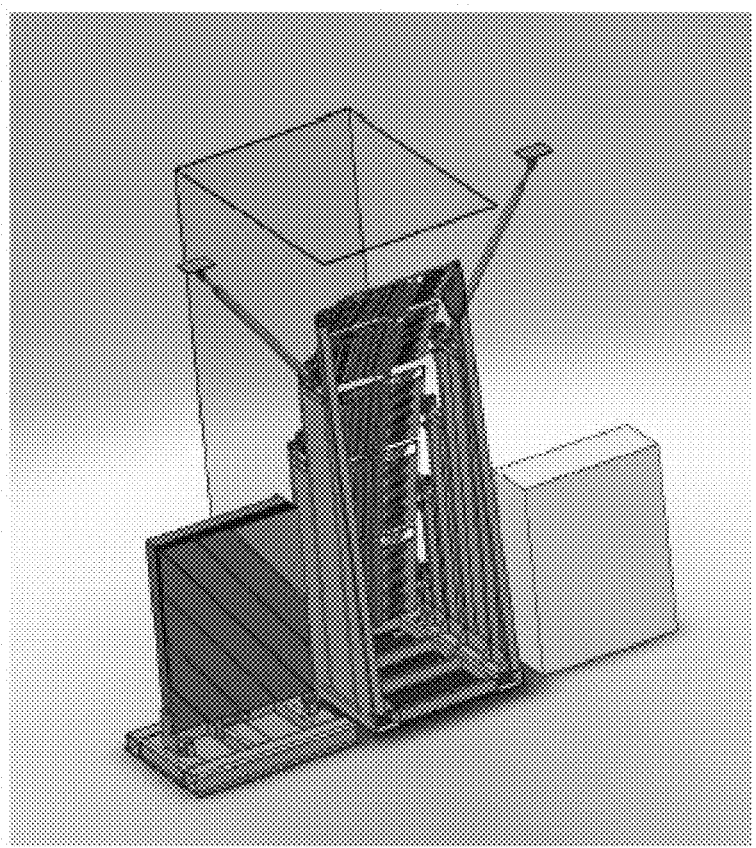

FIG. 20 shows a suitable container which may be used either in conjunction with, or as a component of, a test device for a container sized X-ray system. The container of FIG. 20 has double doors for easy access to areas either side of test pieces centrally placed therein. FIGS. 21 and 22 show different diagrammatic views of the container, illustrating the location of test modules therein. FIG. 23 shows a cross-section of the container, showing the location and design of the penetration module which may be used in this embodiment. In particular it shows the independently rotatable elements of the penetration module which may be rotated so as to obtain maximum shadowing of detectors of the X-ray system. FIGS. 24 and 25 show further details of the penetration, resolution and material discrimination modules of the test device. These again show the penetration module with the independently rotatable elements, each of which comprises a wedge of different thicknesses composed of multiple plates. Separate material discrimination and resolution modules are seen either side of the penetration module. As can be seen in FIG. 25, these modules are independently movable. Each may be readily transportable independently of the other. Each may have insertion regions for inserting forklift forks or tines so that the module is easily transportable using a forklift. These insertion regions may be as described earlier in connection with AUS1 and AUS2. FIGS. 24 and 25 also show a region of the container steel sheeting which will be replaced by plastic in which AUS4 is located enabling accurate assessment of at least one of the tests of this test device.

The invention claimed is:

1. A test device for assessing an X-ray system with a medium or a large tunnel size for its detection capability, the medium tunnel size ranging from 1 m to 1.3 m×1 m to 1.3 m and the large tunnel size being greater than 1.3 m×1.3 m, the device comprising:
 a support capable of holding at least one test module;
 at least one test module mounted on the support, wherein the at least one test module is removable from the support;
 a stand coupled to the support;
 a rotatable holder coupled to the stand, wherein the rotatable holder holds the support at a predetermined angle to the horizontal and enables the predetermined angle to be varied, wherein the stand comprises a base having a through-hole arranged beneath the at least one test module, the through-hole configured to be larger than a footprint of the at least one test module when arranged at the predetermined angle;
 a latching mechanism configured to lock the rotatable holder and the support in place relative to the stand and at the predetermined angle, wherein the at least one test module is maintained at the predetermined angle;
 and an insertion region for inserting forklift forks;
 wherein at least one of the test modules is capable of being used in a test for an aspect of the detection capability.

2. The test device of claim 1 wherein the at least one test module comprises a wedge construction.

3. The test device of claim 1 wherein the test is selected from the group consisting of wire resolution in air, wire resolution between steel, contrast sensitivity and materials discrimination.

4. The test device of claim 3, comprising at least two test modules, each being capable of being used in a different test.

5. The test device of claim 4, comprising a test module capable of being used in a test of wire resolution in air, a test module capable of being used in a test of wire resolution between steel, a test module capable of being used in a test of contrast sensitivity and a test module capable of being used in a test of materials discrimination.

6. The test device of claim 5 wherein the device is capable of being used in all of tests 1 to 9 as defined in ASTM F792-01.

7. The test device of claim 6, the device having a size capable of passing through an examination tunnel having dimensions 1300 mm×1300 mm.

8. The test device of claim 7, wherein the test device has a size that is incapable of being used in an examination tunnel having dimensions less than about 1 meter×1 meter.

9. The test device of claim 5, the device having a size capable of being mounted on a 1200 mm×1200 mm pallet.

10. The test device of claim 5 wherein the test or tests can be conducted using a single pass of the test device through an examination tunnel of the X-ray system where the X-ray system is a single view X-ray system, or using two passes through an examination tunnel of the X-ray system where the X-ray system is a dual view system.

11. The test device of claim 5, wherein the tunnel has a size sufficient to scan a shipping container having a length of 6 m, a height of 2.4 m and a width of 2.4 m, said device further comprising a radioactive source for testing a capability of a radiation portal for detection of a radioactive substance.

12. The test device of claim 11, wherein the radioactive source comprises potassium-40 or at least one of the radioisotopes listed in ANSI N42.35-2006.

13. The test device of claim 5 wherein the tunnel has a size sufficient to scan a shipping container having a length of 6 m, a height of 2.4 m and a width of 2.4 m, and wherein the test device comprises at least two independently movable test modules.

14. The test device of claim 13, wherein the test modules are each independently selected from the group consisting of a materials discrimination module, a resolution module and a penetration module.

15. The test device of claim 14, wherein the penetration module comprises a plurality of independently rotatable elements.

16. The test device of claim 15, wherein each of the rotatable elements is independently lockable into a desired orientation.

17. A method for assessing an X-ray system with a large tunnel size for its detection capability, the method comprising:
passing a test device according to claim 1 through an examination tunnel of said X-ray system so as to expose the test module(s) to X-rays from the system;
detecting any X-rays that pass through the test module(s), using the X-ray system to generate an image;
determining one or more test results from the image; and
assessing the detection capability of the X-ray system from the test result(s).

18. The method of claim 17 further comprising varying the angle of the support to the predetermined angle using the rotatable holder before passing the test device through a tunnel of the X-ray system.

19. The method of claim 18, the method further comprising locking the support by means of the latching mechanism so as to maintain the at least one test module at the predetermined angle.

20. The method of claim 17, wherein when the X-ray system is a single view X-ray system the test device is passed through the tunnel exactly once, and when the X-ray system is a dual view system the test device is passed through the tunnel exactly twice.

21. The method of claim 17, wherein the test device comprises at least two test modules, each being capable of being used in a different test and the assessing step comprises aggregating the test results into a single aggregate score and assessing the operation of the X-ray system using the aggregate score.

22. The method of claim 21, wherein the aggregating comprises adding the test results to obtain the single aggregate score.

23. A method of scanning an object using an X-ray system having a medium or large tunnel, the method comprising:
assessing the detection capability of an X-ray system according to the method of claim 17;
if necessary, adjusting the X-ray system so as to improve its detection capability; and
passing the object through the tunnel and scanning the object as it passes through the tunnel.

24. The method of claim 23, further comprising forming an image of the scanned object and determining from the image the presence or absence of a certain class of object in the scanned object.

25. A method for assessing a radiation portal with a large tunnel size for its detection capability, the method comprising:
passing a test device according to claim 1 through a radiation portal, said test device comprising a radioactive source;
determining whether a radiation detector of said portal can detect the radioactive source; and
using the determination to assess the detection capability.

26. The method of claim 25, wherein the test device further comprises a modified shipping container which has external dimensions about 6 m in length and about 2.4 m in both height and width, the support and at least one test module being disposed within the modified shipping container, wherein the modified shipping container has at least a portion of its walls made of a plastic that is substantially transparent to X-rays, whereby, X-rays passing from an X-ray source through at least one of the test modules passes through the plastic in order to reach an X-ray detector.

27. A system for scanning an object comprising:
an X-ray system having a medium or large tunnel, and having the capacity to form an image of an object scanned thereby; and
a test device according to claim 1.

28. The system of claim 27, further comprising a computer having software loaded thereon, the software being capable of enhancing a raw image obtained by the X-ray system of said scanned object so as to form the image.

29. The test device of claim 5, wherein one of the test modules is a test of wire resolution in air.

30. The test device of claim 5, further comprising a steel mounting plate on which at least one of the test modules is disposed.

31. The test device of claim 30, wherein the mounting plate is about 10 mm thick.

32. The test device of claim 30, wherein the mounting plate is balanced so as to be rotatable by hand when the support is not locked.

33. The test device of claim 30, wherein one of the test modules comprises a steel step wedge disposed on the mounting plate for testing contrast sensitivity.

34. The test device of claim 33, wherein the step wedge is disposed diagonally on the mounting plate.

35. A test device for assessing an X-ray system with a large tunnel, the device comprising:
a support capable of holding at least one test module;
at least one test module mounted on the support, wherein the at least one test module is removable from the support;
a stand coupled to the support;
a rotatable holder coupled to the stand, wherein the rotatable holder holds the support at a predetermined angle to the horizontal and enables the predetermined angle to be varied, wherein the stand comprises a base having a through-hole arranged beneath the at least one test module, the through-hole configured to be larger than a footprint of the at least one test module when arranged at the predetermined angle;
a latching mechanism configured to lock the rotatable holder and the support in place relative to the stand and at the predetermined angle, wherein the at least one test module is maintained at the predetermined angle; and
an insertion region for inserting forklift forks;
wherein at least one of the test modules is capable of being used in a test for an aspect of the detection capability; and
wherein the tunnel has a size sufficient to scan a shipping container having a length of 6 m, a height of 2.4 m and a width of 2.4 m, the device comprising a modified shipping container having external dimensions of about 6 m in length and about 2.4 m in both height and width, the support and at least one test module being disposed within the modified shipping container.

36. The test device of claim 35, wherein the modified shipping container comprises double doors at either end for inserting or removing the at least one test module into or from said container.

37. The test device of claim 35, wherein the modified shipping container has at least a portion of its walls made of a plastic that is substantially transparent to X-rays, whereby, X-rays passing from an X-ray source through at least one of the test modules passes through the plastic in order to reach an X-ray detector.

38. The test device of claim 35, wherein the at least one test module comprises a wedge construction.

* * * * *

UNITED STATES PATENT AND TRADEMARK OFFICE
CERTIFICATE OF CORRECTION

PATENT NO. : 9,720,114 B2
APPLICATION NO. : 13/000903
DATED : August 1, 2017
INVENTOR(S) : Ned Blagojevic and Dudley Creagh It is certified that error appears in the above-identified patent and that said Letters Patent is hereby corrected as shown below:

On the Title Page

At item (73) (Assignee), delete "Australian Nuclear Science and Technology Organization" and insert --Australian Nuclear Science and Technology Organisation--

Signed and Sealed this
Thirtieth Day of October, 2018

Andrei Iancu
*Director of the United States Patent and Trademark Office*